United States Patent
Kodama

(10) Patent No.: US 10,572,985 B2
(45) Date of Patent: Feb. 25, 2020

(54) IMAGE PROCESSING CIRCUIT WITH MULTIPLIERS ALLOCATED BASED ON FILTER COEFFICIENTS

(71) Applicant: CANON KABUSHIKI KAISHA, Tokyo (JP)

(72) Inventor: Shigeo Kodama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 178 days.

(21) Appl. No.: 15/812,713

(22) Filed: Nov. 14, 2017

(65) Prior Publication Data

US 2018/0144452 A1    May 24, 2018

(30) Foreign Application Priority Data

Nov. 18, 2016 (JP) ................................ 2016-224915
Aug. 24, 2017 (JP) ................................ 2017-161038

(51) Int. Cl.
*G06T 5/20* (2006.01)
*H04N 19/117* (2014.01)

(52) U.S. Cl.
CPC ............ *G06T 5/20* (2013.01); *H04N 19/117* (2014.11); *G06T 2207/20012* (2013.01); *G06T 2207/20024* (2013.01)

(58) Field of Classification Search
None
See application file for complete search history.

(56) References Cited

U.S. PATENT DOCUMENTS

| | | | | |
|---|---|---|---|---|
| 5,050,119 A | * | 9/1991 | Lish | H03H 21/0012 348/E5.084 |
| 5,471,411 A | * | 11/1995 | Adams | H03H 17/0628 708/300 |
| 5,777,910 A | * | 7/1998 | Lu | H04L 25/03012 348/E5.084 |
| 6,594,399 B1 | * | 7/2003 | Camus | G06T 5/20 382/260 |
| 6,963,890 B2 | * | 11/2005 | Dutta | H03H 17/0275 708/316 |

(Continued)

FOREIGN PATENT DOCUMENTS

| | | |
|---|---|---|
| JP | 61-118012 A | 6/1986 |
| JP | 62-105518 A | 5/1987 |
| JP | 5-103228 A | 4/1993 |

*Primary Examiner* — Andrae S Allison
(74) *Attorney, Agent, or Firm* — Canon U.S.A., Inc. IP Division

(57) ABSTRACT

An image processing circuit executes filter processing using a filter with respect to image data. The image processing circuit includes a supply unit and a plurality of multipliers. The supply unit is configured to supply M (M: a natural number) pieces of data of filter taps from data of interest in the image data and a data group in a vicinity of the data of interest. Each of the plurality of multipliers is configured to hold a coefficient having a predetermined bit count and multiply one of the M tap data with the corresponding coefficient according filter coefficients constituting the filter. Each of the plurality of multipliers is allocated to the one of the M tap data based on an allocation rule related to the plurality of predetermined bit counts and the filter coefficients constituting the filter.

10 Claims, 20 Drawing Sheets

(56) References Cited

U.S. PATENT DOCUMENTS

| | | | |
|---|---|---|---|
| 7,218,672 B2 * | 5/2007 | Birru | H04L 25/03057 375/233 |
| 7,606,300 B2 * | 10/2009 | Lim | H04L 1/0047 375/229 |
| 2003/0138038 A1 * | 7/2003 | Greiss | H04B 1/0003 375/232 |

* cited by examiner

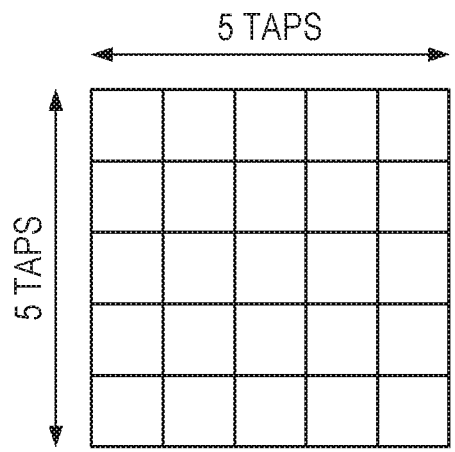
FIG. 2A
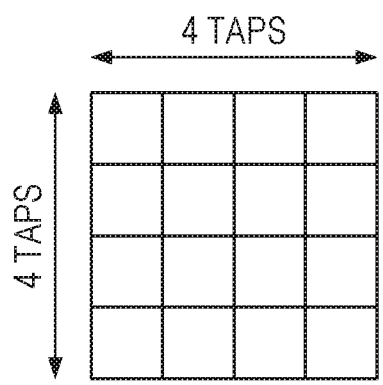
FIG. 2B
FIG. 2C
| O | K | G | C | G | K | O |
|---|---|---|---|---|---|---|
| N | J | F | B | F | J | N |
| M | I | E | A | E | I | M |
| L | H | D |   | D | H | L |
| M | I | E | A | E | I | M |
| N | J | F | B | F | J | N |
| O | K | G | C | G | K | O |

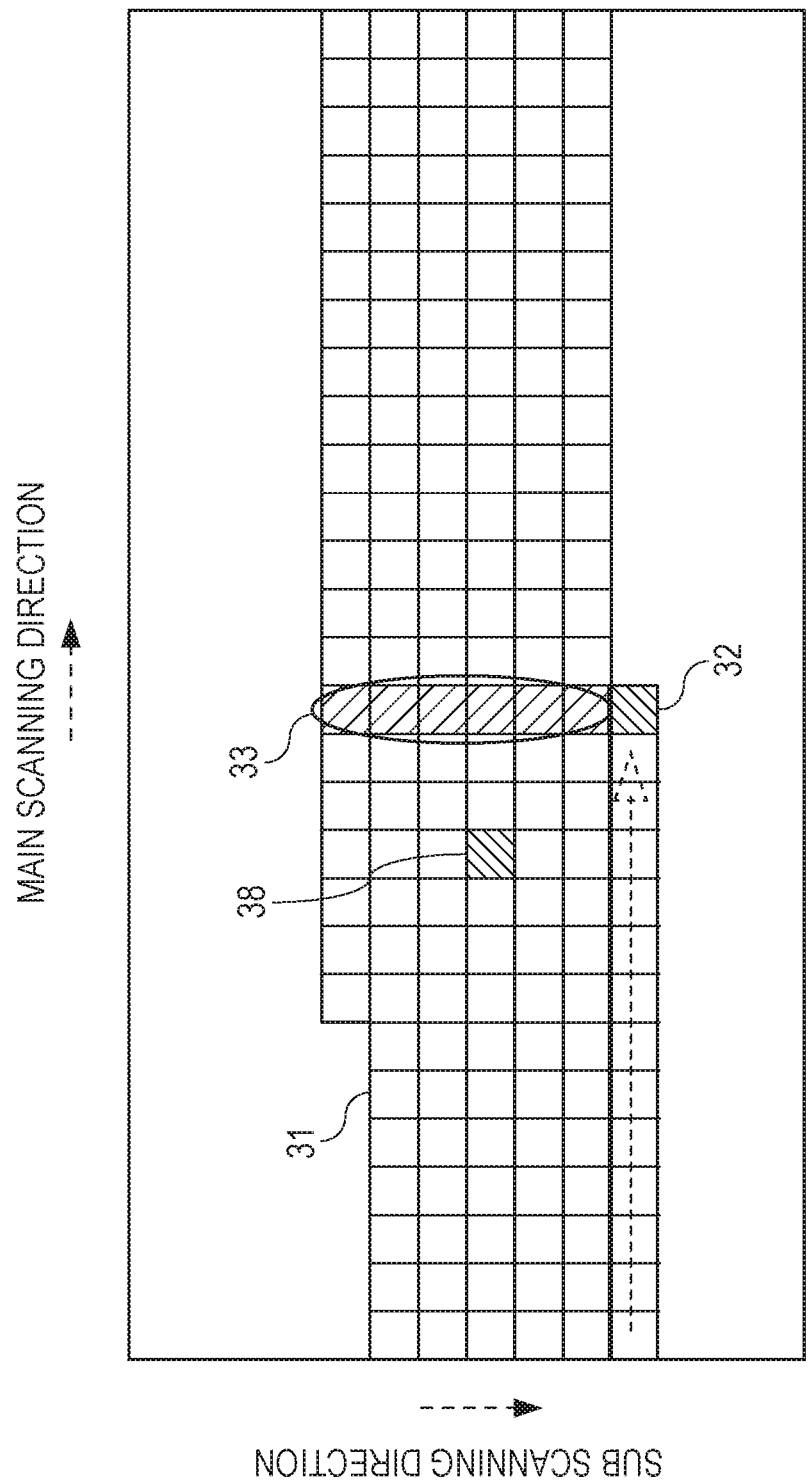

ASSOCIATE WITH FILTER TAP ON ONE-TO-ONE BASIS

ASSOCIATE ONE BY ONE IN ORDER OF DISTANCE

FIG. 11

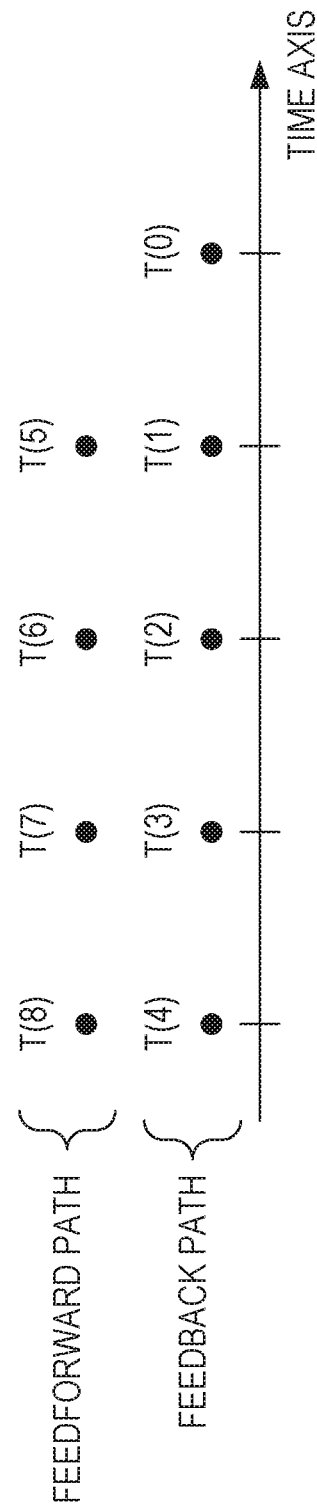

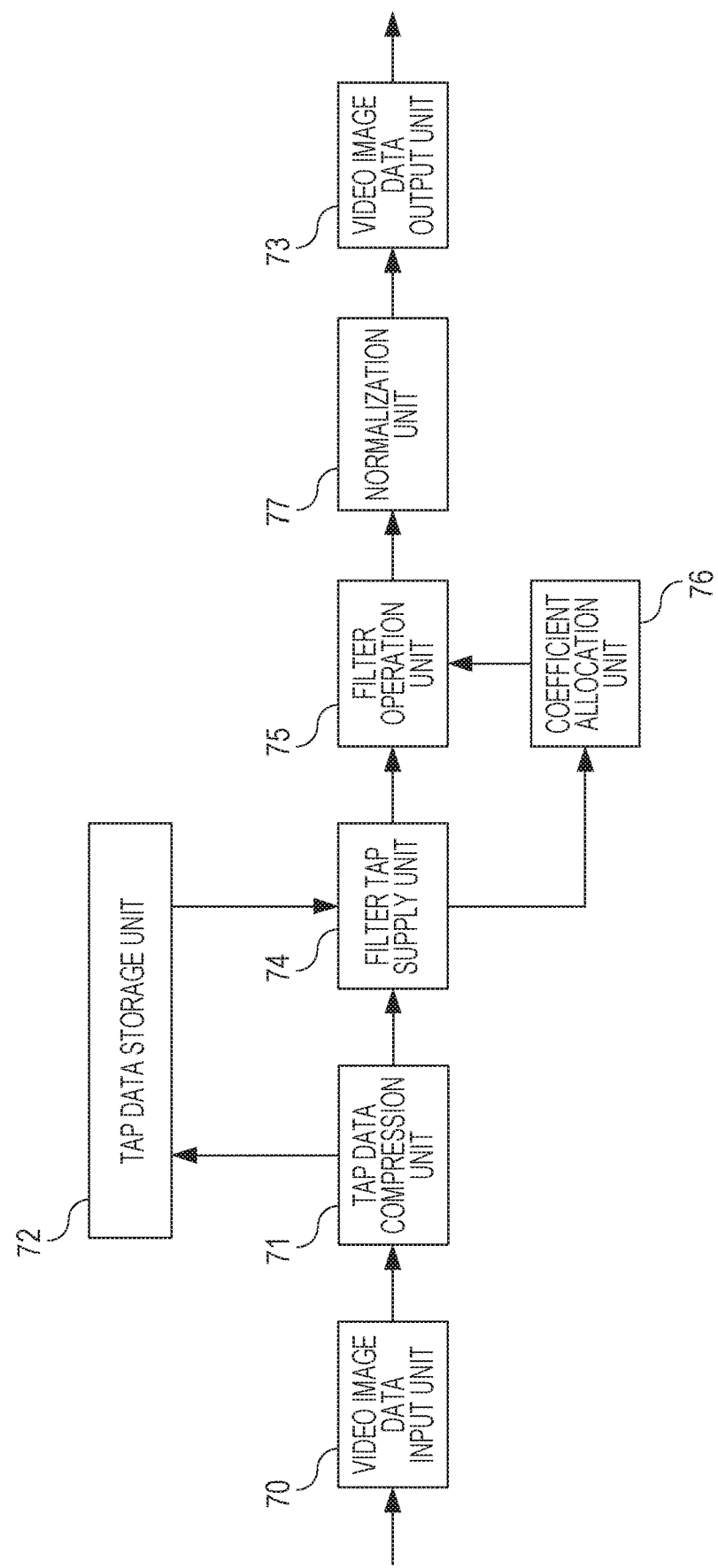

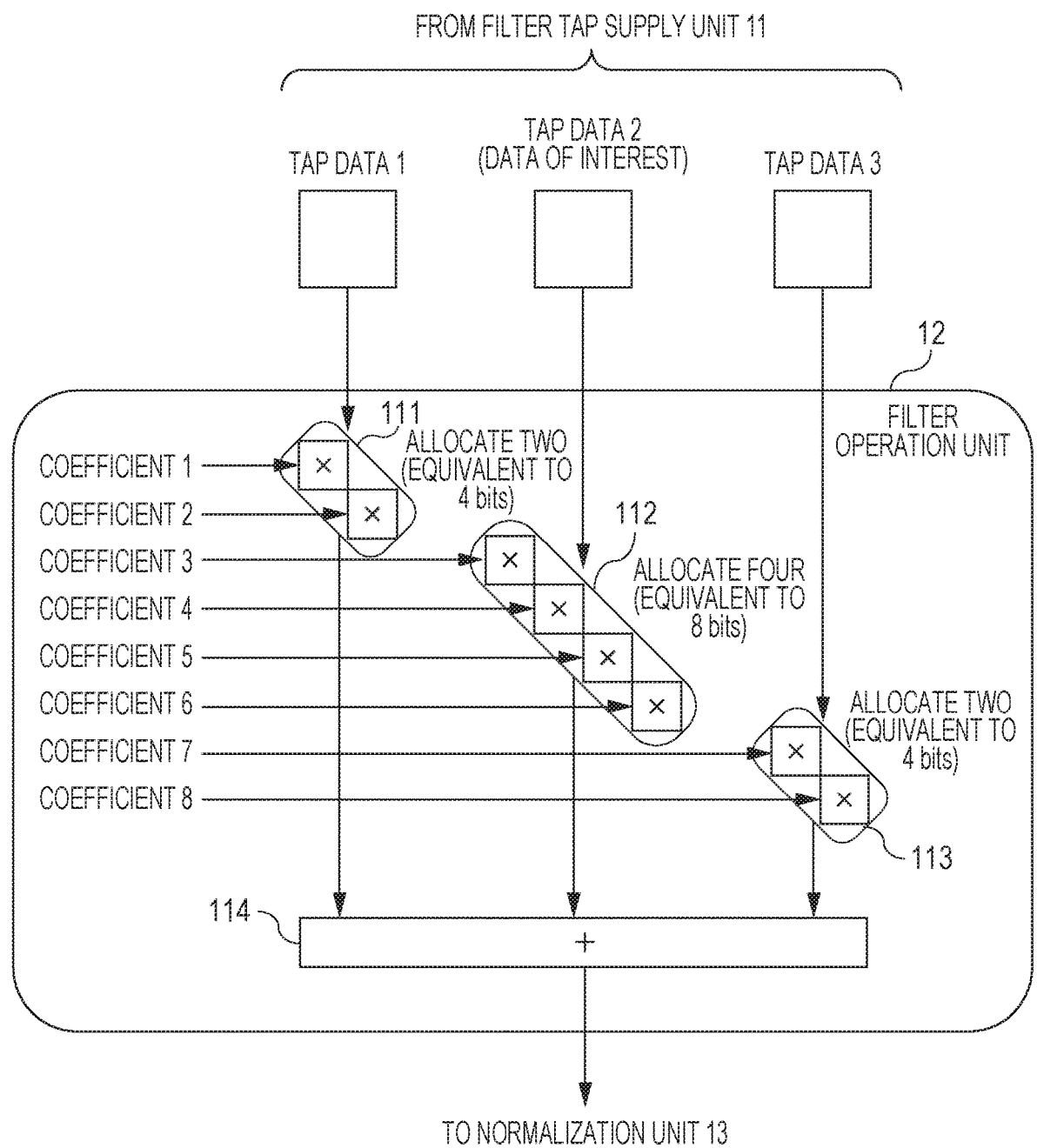

IMAGE PROCESSING CIRCUIT WITH MULTIPLIERS ALLOCATED BASED ON FILTER COEFFICIENTS

BACKGROUND OF THE INVENTION

Field of the Invention

One disclosed aspect of the embodiments relates to an image processing circuit that performs filter processing on digital signal data.

Description of the Related Art

Execution of various filter processings on digital signal data such as image data at a high speed is demanded following developments in digital devices. The filter processings demanded to be executed at a high speed are generally realized by a filter circuit corresponding to dedicated-use hardware. On the other hand, since the dedicated-use filter circuit increases manufacturing costs as its circuit scale is enlarged to be more complicated, a technology for decreasing the circuit scale has been proposed up to now.

Japanese Patent Laid-Open No. 61-118012 describes a technology in which mutual outputs of taps with respect to symmetric coefficients are previously added to each other by using the symmetry of the filter coefficients, and the added output and an output of a central tap are subjected to bit shift in accordance with an operation word length to be then supplied to multipliers that multiply the respective filter coefficients. As a result, the number of times to perform the multiplication in the filter having the symmetric coefficients is decreased.

Japanese Patent Laid-Open No. 62-105518 describes a technology in which a multiplication coefficient is stored in a manner that a part where a coefficient value is large is stored at double precision, and a part where a coefficient value is small is stored at single precision, and a double precision coefficient is divided into a higher digit and a lower digit to be multiplied with an input sample sequence to execute double precision multiplication.

In addition, Japanese Patent Laid-Open No. 5-103228 describes a technology in which a transversal filter in a variable delay filter unit is constituted in a manner that coefficient bit counts are decreased from a filter center towards a filter end to reduce a bit width of a multiplier. The term "bit count" here may refer to the size or the width of the binary word representing a number.

Up to now, to constitute a filter that is compatible with various filter processings by using a single filter circuit, components that satisfy maximum specifications among specifications demanded by the respective filter processings (for example, the number of filter taps, the filter coefficients, and the like) are to be selected.

For example, the highest number of filter taps among the respective filter processings is to be selected. In addition, a variable filter coefficient is to be selected, and a filter coefficient having a largest bit width is to be selected. In this manner, the filter circuit constituted to satisfy the maximum specifications among the plurality of filter processings has the inefficient circuit configuration having the increased circuit scale in which the specification that is not actually used can also be realized.

Since the technologies described in Japanese Patent Laid-Open No. 61-118012 and Japanese Patent Laid-Open No. 5-103228 relate to the filter circuit in which a particular filter processing is individually optimized, the technologies are not intended to switch and use the plurality of filter processings.

In addition, according to the technology described in Japanese Patent Laid-Open No. 62-105518, the single precision multiplication is executed twice to perform the double precision multiplication once, and accumulation addition is performed after digit matching is performed by a digit shifter. Therefore, the technology is not appropriately employed for a filter circuit used for a high-speed filter processing.

SUMMARY OF THE INVENTION

An aspect of the embodiments has been made in view of the above-described issues and provides a filter that can appropriately implement a plurality of filter processings while an increase in a circuit scale is suppressed, a filter processing method, and a program.

To address the above-described issues, according to an aspect of the embodiments, an image processing circuit executes filter processing using a filter with respect to image data. The image processing circuit includes a supply unit and a plurality of multipliers. The supply unit is configured to supply M (M: a natural number) pieces of data of filter taps from data of interest in the image data and a data group in a vicinity of the data of interest. Each of the plurality of multipliers is configured to hold a coefficient having a predetermined bit count and multiply one of the M tap data with the corresponding coefficient according filter coefficients constituting the filter. Each of the plurality of multipliers is allocated to the one of the M tap data based on an allocation rule related to the plurality of pre-determined bit counts and the filter coefficients constituting the filter.

Further features of the disclosure will become apparent from the following description of exemplary embodiments with reference to the attached drawings.

BRIEF DESCRIPTION OF THE DRAWINGS

FIG. 2A, FIG. 2B, and FIG. 2C are illustrative diagrams for describing a filter tap according to the first exemplary embodiment.

FIG. 3 is an illustrative diagram for describing a supply of data of interest according to the first exemplary embodiment.

FIG. 11 illustrates an order of distance from the data of interest to the tap data according to the second exemplary embodiment.

FIG. 14A and FIG. 14B are illustrative diagrams for describing a calculation in the order of distance from the data of interest to the tap data according to the second exemplary embodiment.

FIG. 15 is a block diagram illustrating a configuration example of the filter circuit according to a third exemplary embodiment.

FIG. 19 is a schematic diagram illustrating the filter operation circuit according to the first exemplary embodiment.

DESCRIPTION OF THE EMBODIMENTS

Hereinafter, exemplary embodiments will be described in detail with reference to the accompanying drawings. It should be noted that the exemplary embodiments described below are examples of realization devices of the embodiments and are to be appropriately modified or altered in accordance with a configuration of an apparatus to which the disclosure is applied and various conditions, and the disclosure is not necessarily limited to the following exemplary embodiments. In addition, all of combinations of features described according to the exemplary embodiments are not necessarily used for the solving devices of the disclosure. It should be noted that the same configuration is assigned with the same reference sign for the descriptions.

Hereinafter, descriptions will be given of a filter circuit corresponding to an image processing circuit according to a first exemplary embodiment. According to the first exemplary embodiment, descriptions are given while it is assumed that two types of finite impulse response (FIR) filter processings with respect to image data are switched. It should be noted that the filter is constituted by a plurality of taps that hold tap data generated from respective pixels in the image data. Each tap corresponds to a filter coefficient and is used for calculating a product sum of the tap data and the filter coefficient. For example, a filter illustrated in FIG. 2A includes filter coefficients corresponding to 5 taps×5 taps (25 taps in total) in a window corresponding to an area of 5 pixels×5 pixels. Herein, a tap located in a center in the filter is referred to as a central tap. When the filter processing using the filter is executed with respect to the image data, the central tap of the filter is sequentially associated with the respective pixels in the image data. Hereinafter, a pixel of a processing target corresponding to the central tap is referred to as a pixel of interest. Therefore, a pixel value of the pixel of interest corresponding to the central tap (data of interest) and each of pixel values of its neighborhood pixels (24 pixels in the case of the filter illustrated in FIG. 2A) are input to the filter circuit as the tap data in an operation using the filter illustrated in FIG. 2A.

Figure 1:
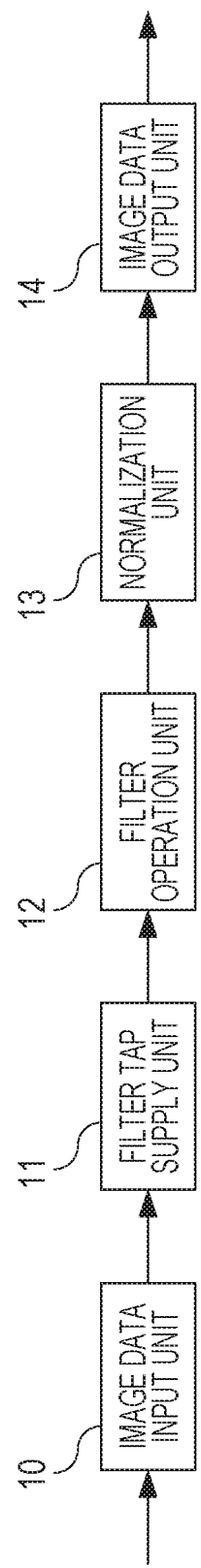
FIG. 1 is a block diagram illustrating a configuration example of a filter circuit according to a first exemplary embodiment.

FIG. 1 is a block diagram illustrating a configuration example of a filter circuit according to the first exemplary embodiment. The filter circuit according to the present exemplary embodiment includes an image data input unit 10, a filter tap supply unit 11, a filter operation unit 12, a normalization unit 13, and an image data output unit 14.

The image data input unit 10 supplies digital signal data input from an external apparatus (hereinafter, "image data" will be described as an example) to the filter tap supply unit 11. The filter tap supply unit 11 supplies data (tap data) of the filter tap having the number of taps used for the filter processing to be realized with respect to the pixel of interest in the image data to the filter operation unit 12. A detail of the filter tap supply unit 11 will be described below. The filter operation unit 12 performs the filter operation (product-sum operation) on the tap data supplied from the filter tap supply unit 11 and supplies a product-sum operation result to the normalization unit 13. The normalization unit 13 normalizes the product-sum operation result calculated by the filter operation unit 12 to be supplies to the image data output unit 14. The image data output unit 14 outputs the output data normalized by the normalization unit 13 to the external apparatus as output image data.

Figure 18A:
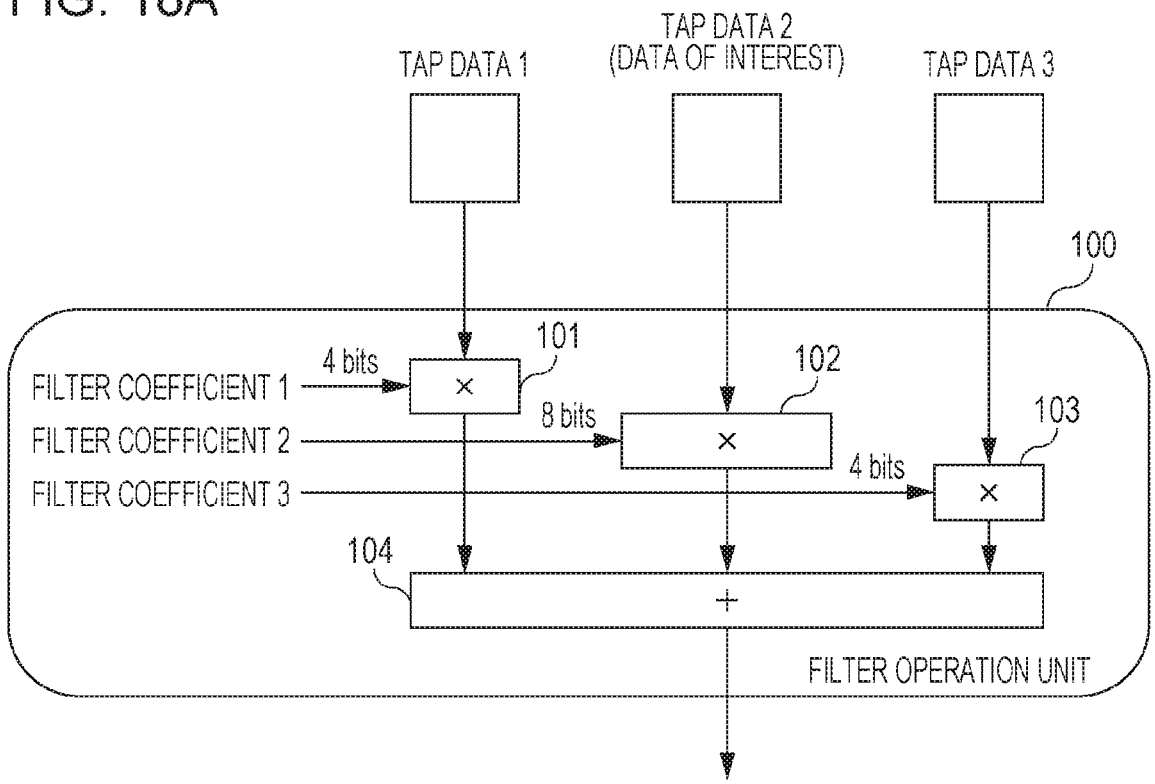
FIG. 18A and FIG. 18B are schematic diagrams illustrating an outline of a filter operation circuit to which a related-art technology is applied.
Figure 18B:
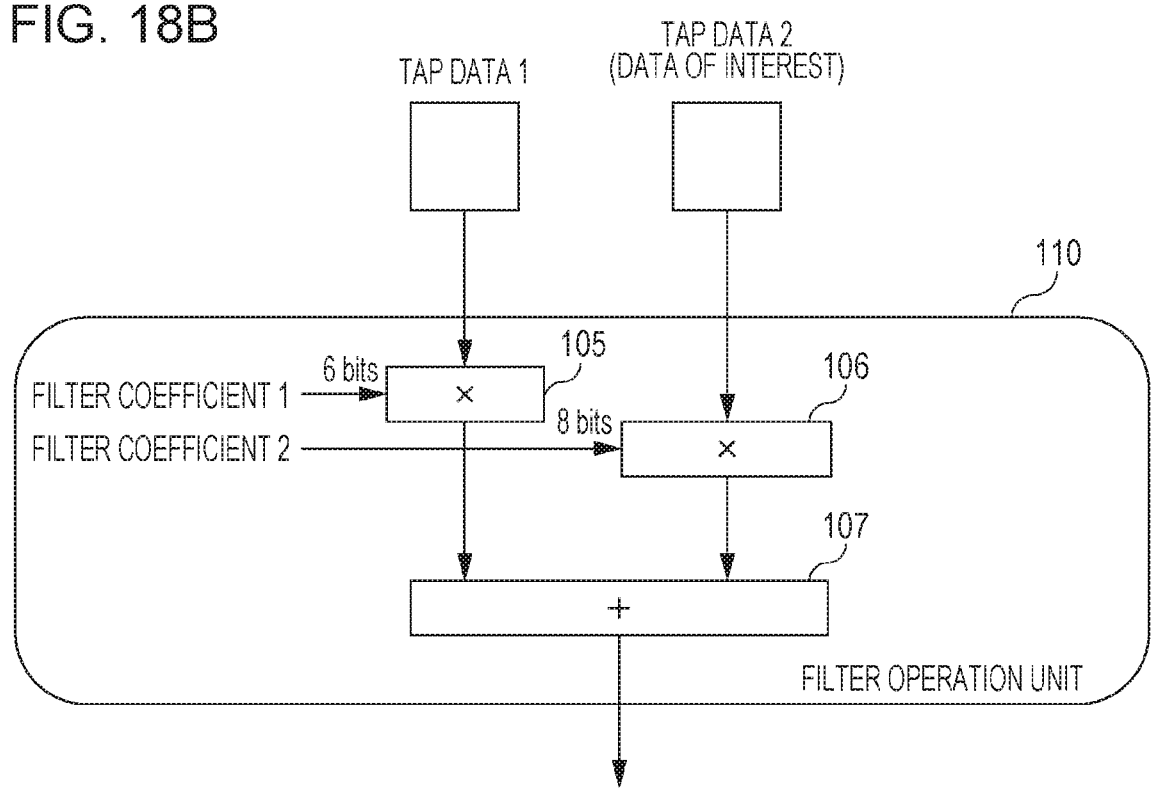

Hereinafter, an outline of the filter processing executed by the filter circuit according to the present exemplary embodiment will be described. FIG. 18A, FIG. 18B, FIG. 19, and FIG. 20 are schematic diagrams for describing processing in the filter operation unit 12. FIGS. 18A and 18B schematically illustrate filter operation units 100 and 110 to which a related-art technology is applied. Multipliers 101, 102, and 103 (105 and 106) are associated with input tap data on a one-to-one basis in the filter operation units 100 and 110. Previously set filter coefficients are associated with the respective multipliers, and the respective multipliers multiply the filter coefficients by the tap data. To realize the filter operation using a plurality of different filters in an image processing apparatus, various multipliers are to be used in accordance with the respective filters.

Figure 4:
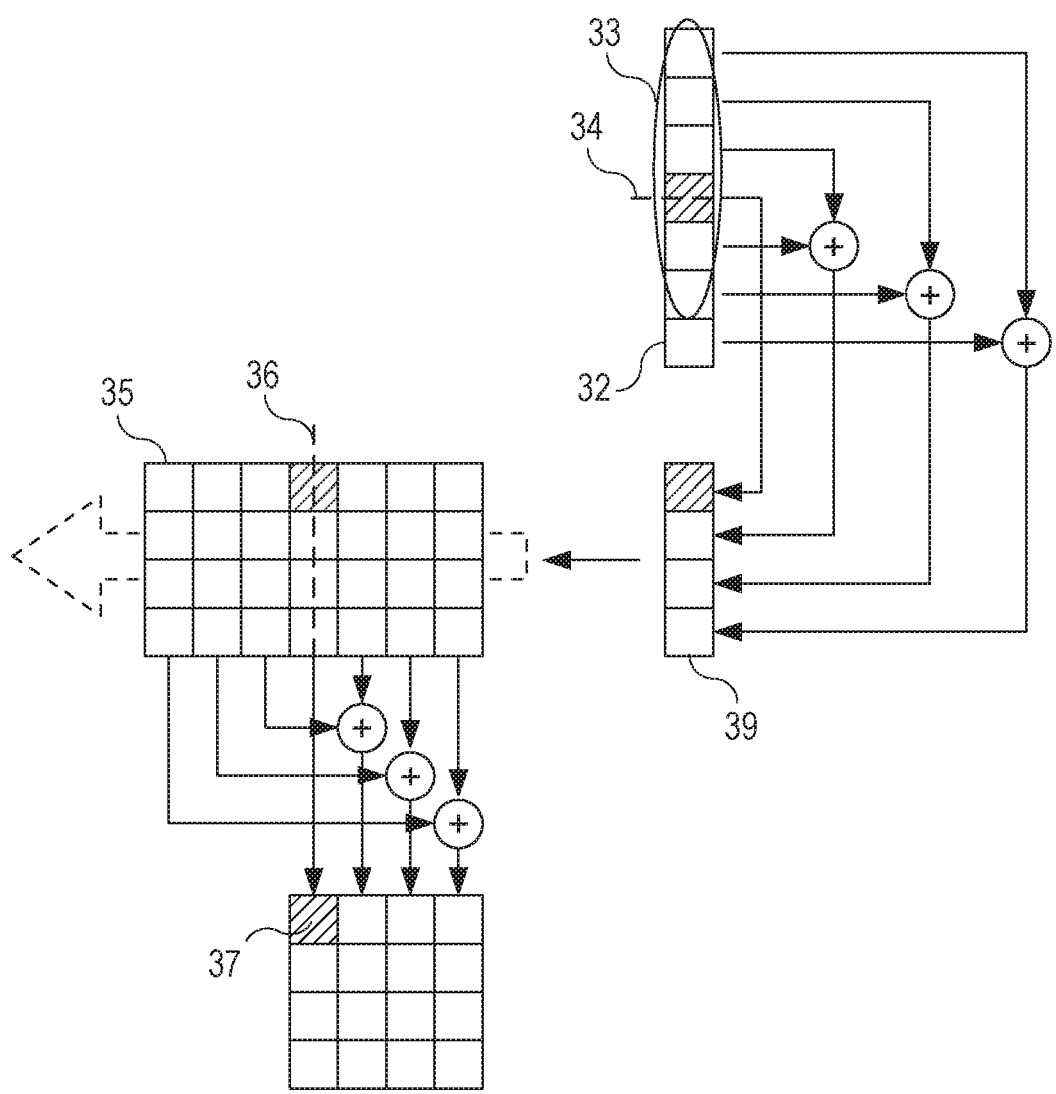
FIG. 4 is an illustrative diagram for describing a supply of data of the filter tap according to the first exemplary embodiment.

For example, three pieces of tap data (tap data 1, tap data 2, and tap data 3) are used in the filter operation unit 100 illustrated in FIG. 18A, and 4-bit multiplication, 8-bit multiplication, and 4-bit multiplication are to be performed for the respective tap data. On the other hand, two pieces of tap data (tap data 1 and tap data 2) are used in the filter operation unit 110 illustrated in FIG. 18B, and 6-bit multiplication and 8-bit multiplication are to be performed for the respective tap data.

The number of used multipliers (multipliers 101 to 103) is high in the filter operation unit 100 illustrated in FIG. 18A, and the bit count of used multipliers (multipliers 105 and 106) is high in the filter operation unit 110 illustrated in FIG. 18B. For this reason, to realize the filter operation unit 100 and the filter operation unit 110 by using a common circuit, at least an 8-bit multiplier, a 6-bit multiplier, and a 4-bit multiplier are to be prepared to be switched and used.

Figure 20:
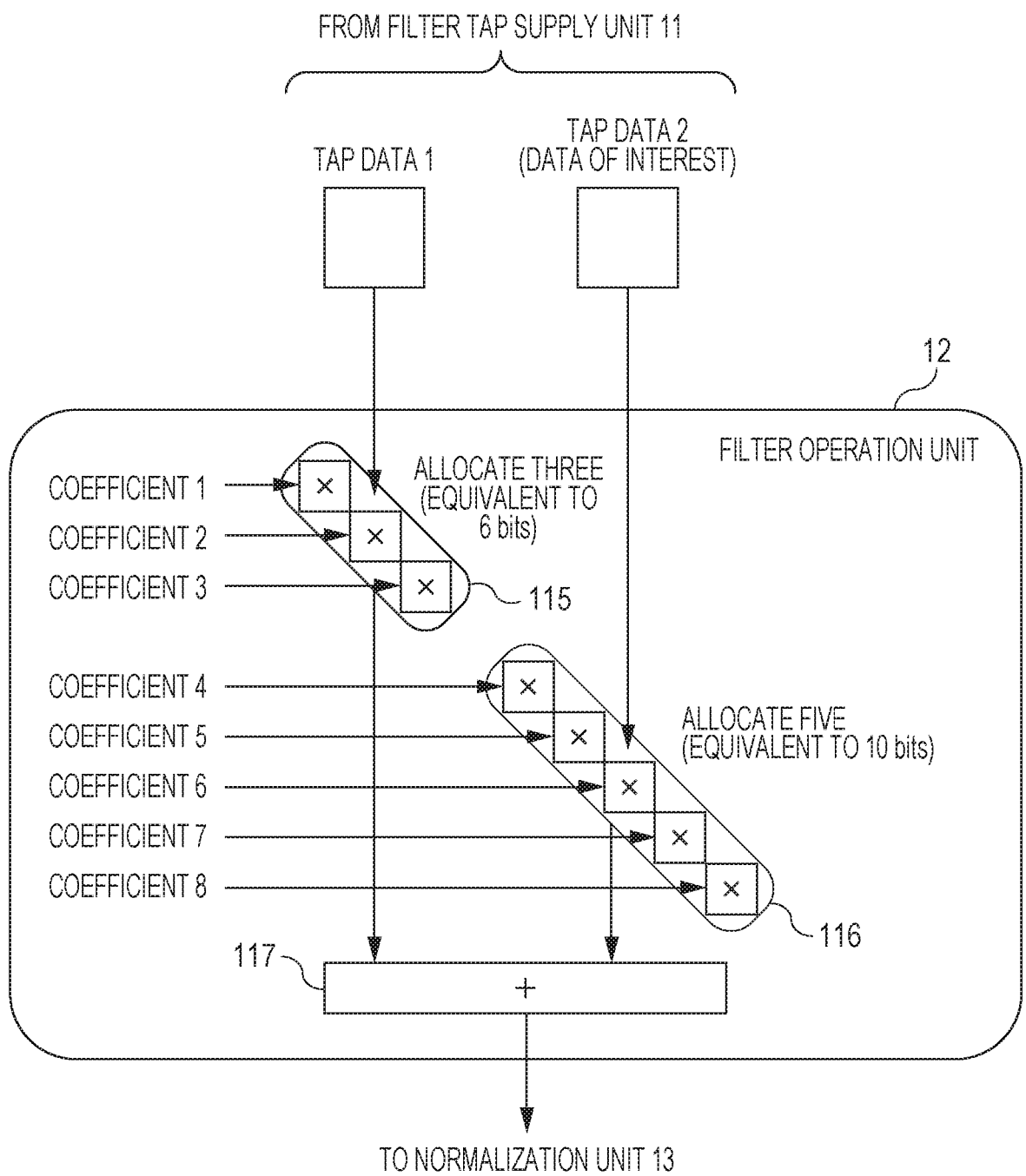
FIG. 20 is a schematic diagram illustrating the filter operation circuit according to the first exemplary embodiment.

FIG. 19 and FIG. 20 schematically illustrate the filter operation unit 12 according to the present exemplary embodiment. The filter operation unit 12 includes a plurality of multipliers that can perform multiplication of a predetermined bit count (herein, 2 bits). It should be noted that a plurality of multipliers are associated with one piece of tap data. In this manner, according to the present exemplary embodiment, multipliers are allocated, assigned, or selected to the tap data in accordance with bit counts used for the respective filter operations. For example, as illustrated in FIG. 19, two multipliers 111 (113) are allocated in a case where 4-bit multiplication is to be performed, and four multipliers 112 are allocated in a case where 8-bit multiplication is to be performed. In the case of the filter operation circuit illustrated in FIG. 20, three multipliers 115 are allocated for 6-bit multiplication, and four multipliers are allocated for 8-bit multiplication.

It should be noted however that eight multipliers that can perform 2-bit multiplication are to be used for the filter operation illustrated in FIG. 19 in this case. For this reason, in a case where the filter circuit is commonly used, one multiplier is excessive in the filter operation illustrated in FIG. 20. In view of the above, according to the present exemplary embodiment, a coefficient allocation unit allocates five multipliers 116 to an operation equivalent to an 8-bit operation to make an operation equivalent to a 10-bit operation. As a result, it is possible to suppress a scale of multipliers to be used in the filter processing circuit that switches the plurality of filter processings as compared with the case where the filter circuit is commonly used in FIGS. 18A and 18B. In addition, when the bit count of the single multiplier is set to be lower than the bit count of the filter coefficient, it is possible to allocate the excessive multiplier to one of the tap data as in the case of FIG. 20. That is, the coefficient corresponding to the multiplier can be allocated so as to be higher than the bit width of the filter.

As a result, it is possible to set a still higher accurate filter coefficient with respect to the tap data to which the excessive multiplier is allocated. In particular, in a case where an excessive multiplier exists according to the present exemplary embodiment, the allocation with respect to the tap data at a short distance from the data of interest is performed by priority. As a result, the filter operation can be performed more accurately with respect to the tap data in the vicinity of the more important data of interest in the filter operation.

Hereinafter, the filter processing executed by the filter circuit according to the first exemplary embodiment will be described in detail. The image data input unit 10 obtains digital image data (image data) corresponding to the target of the filter processing from the external apparatus and supplies the image data to the filter tap supply unit 11. For example, the external apparatus that inputs the image data includes a device configured to obtain the image data in real time such as an image sensor and a storage device configured to temporarily hold the image data such as a main storage unit.

The filter tap supply unit 11 supplies the tap data having the number of taps used for the filter processing to be realized with respect to the pixel of interest in the image data to the filter operation unit 12 in accordance with the filter processing in the filter operation unit 12 in a subsequent stage. It should be noted that the filter operation unit 12 in the subsequent stage switches the plurality of filter processings according to the present exemplary embodiment. The number of taps to be used for each of the plurality of filter processings, the filter coefficients, and the like may be previously held in registers and the like of the filter tap supply unit 11 and the filter operation unit 12. Certain geometrical characteristics or aspects of the structure or organization of the filter coefficients may be exploited to provide an efficient operation. Examples of these geometrical characteristics or aspects include symmetry and distance. An allocation rule may be developed to allocate the multiplier(s) to appropriate tap data based on at least one of these geometrical aspects. According to the present exemplary embodiment, hereinafter, descriptions will be given of an example in which the filter of 5×5 taps having no coefficient symmetry illustrated in FIG. 2A and the filter of 4×4 taps having the coefficient symmetry illustrated in FIG. 2B are switched in the filter operation unit 12.

It should be noted that the filter coefficients have no symmetry in the filter of 5×5 taps illustrated in FIG. 2A. In this case, the pixel of interest corresponds to the central tap. A pixel value of the pixel of interest is set as the data of interest, and pixel values of neighborhood pixels included in the area of 5 pixels×5 pixels while the pixel of interest is set as the center are input as the tap data. That is, the filter processing result with respect to the pixel of interest is obtained from the product-sum operation on the pixel values of 5 pixels×5 pixels while the pixel of interest is set as the center.

On the other hand, the filter of 4×4 taps having the coefficient symmetry will be described. The filter coefficients in the filter of 7×7 taps will be normally considered. FIG. 2C illustrates an example of isotropic filter coefficients while a central position in the filter coefficients of 7×7 taps is set as a central tap. Herein, the same alphabet means the filter coefficient having the same value. In this case, after a sum (tap data) of the pixel values of the pixels corresponding to the same filter coefficient is calculated, the filter coefficients may be integrated instead of the product-sum operation based on the pixel values of 49 pixels corresponding to the filter coefficients of 7×7 taps.

In view of the above, according to the present exemplary embodiment, the same filter coefficients are omitted, and the filter is held as the filter of 4×4 taps to perform the filter processing using the filter illustrated in FIG. 2C. That is, the central tap is located in the upper left in the filter illustrated in FIG. 2B. In addition, the filter processing result of the pixel of interest is obtained from the product-sum operation on the pixel values of 7 pixels×7 pixels while the pixel of interest is set as the center and the filter coefficients in the filter processing using the filter illustrated in FIG. 2B.

In general, the FIR filter adopts a relatively high number of taps to enhance a performance of the filter. On the other hand, when the number of filter taps is high, the buffer (such as the shift register) that holds the tap data and it is necessary to perform multiplications of the tap data by the filter coefficients many times. For this reason, the number of taps in the filter is preferably low.

Herein, in a case where the filter coefficients have the symmetry as described above, the number of taps in the filter is decreased by using the coefficient symmetry. As will be described below with regard to the filter operation using the filter having the coefficient symmetry, it is possible to enhance the filter performance without increasing the number of filter taps.

FIG. 3 and FIG. 4 are explanatory diagrams for describing a method for the filter tap supply unit 11 to supply the tap data in a case where the filter coefficients have the symmetry. FIG. 3 illustrates the image data. The image data input unit 10 sequentially inputs the image data (pixel value) of the respective pixels to the filter tap supply unit 11 in the stated order of a main scanning direction and a sub scanning direction. The filter tap supply unit 11 includes a buffer 31 such as a line memory that holds the image data (pixel values) of a predetermined number of pixels.

When image data 32 is newly supplied from the image data input unit 10, a state is established in which it is possible to perform processing using a data group in the vicinity of image data (pixel data of interest or the data of interest) 38 at the center or a range where the filter processing is performed. It should be noted that FIG. 3 illustrates an example in which the data group in the vicinity of the image data 38 is set as the image data of 7 pixels×7 pixels while the image data 38 is set as the center.

When the above-described state is established, the filter tap supply unit 11 reads out the image data 32 input from the image data input unit 10 and an image data string 33 previously stored in the buffer 31 and obtains data for one column to be used for the filter processing. Herein, the data for the one column refers to the image data 32 and a predetermined number (in this case, 6) of pieces of image data in a direction opposite to the sub scanning direction from the image data 32 (that is, data in the same column of a line up to six preceding lines).

The filter tap supply unit 11 performs a folding and adding operation on the obtained data for the one column with respect to the first symmetric axis 34 as illustrated in FIG. 4. Furthermore, the filter tap supply unit 11 stores data 39 obtained by the folding and adding operation in a shift register 35 continuous in the main scanning direction (for example, a lateral [X] direction of the image data). It should be noted that the shift register 35 shifts the stored image data in the main scanning direction each time the image data 32 of the new pixel is input from the image data input unit 10 and stores the data 39 obtained by the folding and adding operation with respect to the first symmetric axis 34 in a freed area.

Furthermore, the filter tap supply unit 11 performs the folding and adding operation on the data in the shift register 35 with respect to a second symmetric axis 36 and generates M (M: a natural number) pieces of the tap data in a case where the filter coefficients have the symmetry. As a result of the above-described folding and adding operation, the image data (pixel values) corresponding to the same filter coefficients in the filter illustrated in FIG. 2C are added to one another. Therefore, the number of pieces of the tap data in the filter processing circuit using the filter illustrated in FIG. 2B is 16. Tap data 37 among the tap data generated herein is the image data 38 itself in FIG. 3 (that is, the data of interest) obtained by delaying by three pixels each in the main scanning direction and the sub scanning direction with respect to the input image data 32.

In other words, the image data of the area of 7 pixels×7 pixels is subjected to the folding and adding operation (convolution addition) with respect to the first symmetric axis 34 and the second symmetric axis 36 that pass through the image data 38, and M (4×4:16) pieces of the tap data is generated. The filter processing is performed by using the above-described tap data group as the input to the filter operation circuit. As a result, it is possible to perform the filter processing having the filter performance equivalent to the case where 49 pieces of the image data with regard to the area of 7 pixels×7 pixels are set as the tap data group without changes by using the filter illustrated in FIG. 2C.

Next, the filter operation unit 12 associates (allocates) the multiplier (corresponding to the coefficient) to each tap data of the filter tap supplied by the filter tap supply unit 11 and executes the product-sum operation to perform the filter operation.

Hereinafter, descriptions will be given of an example in which the allocation of N (N: a natural number, for example, 25) pieces of signed 8-bit multipliers with respect to the tap data is switched in accordance with a film specification to perform the filter operation according to the present exemplary embodiment. A single multiplier can set an 8-bit coefficient $C(z)$ including a sign (z: 0 to 24). One or a plurality of coefficients $C(z)$ having a predetermined bit width constitute a single filter coefficient. For example, herein, when the single multiplier is allocated to the single tap data, it is possible to multiply the 8-bit coefficient $C(z)$ (z: 0 to 24) by the input tap data. That is, the filter operation unit 12 performs the filter operation by allocating the multiplier to each tap data in accordance with the presence or absence of the symmetry of the filter coefficients on the basis of the number of tap data (M) and the number of multipliers (N) determining the bit count of the filter coefficient. The filter operation unit 12 holds 25 multipliers that can set the 8-bit coefficient according to the present exemplary embodiment.

It should be noted that the number of previously prepared multipliers and the bit width where multiplication can be performed can be determined as follows in the case of sharing by a filter of a×a taps constituted by k-bit filter coefficients and a filter of b×b taps constituted by l-bit filter coefficients, for example.

A bit width c of the multiplier is set to be higher or equal to (the greatest common divisor+1 (sign bit)) in an effective bit width of an absolute value except for the sign bit among the k bits and the l bits. That is, the number of multipliers is set such that multiplication of the common divisor of the bit width of the filter coefficients can be performed. Although the bit width c of the multiplier can be set as the common divisor+1 other than the greatest common divisor of the k bits and the l bits, circuit overhead is increased when the bit width of the multiplier is decreased. For this reason, in a case where the greatest common divisor is 1 bit, the bit width c of the multiplier is preferably set as 2 bits or higher.

When the bit width c of the multiplier is determined, a number d of the multipliers is determined as the higher one of total numbers of multiplications in the filter having a×a taps and the filter having b×b taps (total numbers of times to perform multiplication for each tap by the multiplier). Alternatively, when the number d of the logical multipliers calculated above is multiplied by a throughput of the filter circuit (the number of times to perform multiplication per cycle or an inverse number of the number of time divisions of the multiplier), it is possible to calculate a number d' of the physical multipliers. The number of multipliers according to the present exemplary embodiment indicates the number of physical multipliers in a case where the number of logical multipliers or the throughput is 1. That is, the number of multipliers can be set as a number in accordance with the maximum total number of multiplications for each of the plurality of filters and the throughput.

Figure 5:
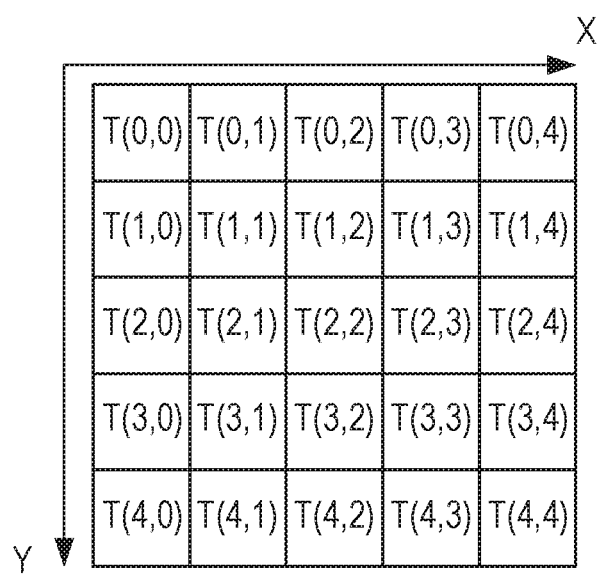
FIG. 5 is an illustrative diagram for describing an allocation of filter coefficients according to the first exemplary embodiment.

FIG. 5 illustrates an example of the tap data with respect to the filter having no symmetry of the filter coefficients illustrated in FIG. 2A. In the case of FIG. 5, since the number of tap data (M) of the filter tap is equal to the number of filter coefficients, the filter tap supply unit 11 supplies the image data for 5 pixels×5 pixels corresponding to the data of interest and its surrounding to the filter operation unit 12 as the tap data without changes. In addition, the number of multipliers is 25 and equal to the number of tap data (M) and the number of filter coefficients. That is, it is sufficient when tap data $T(x, y)$ is associated with the multiplier on a one-to-one basis, and the filter operation unit 12 executes the product-sum operation $S=\Sigma(T(z \% 5, z \div 5)*C(z))$ to perform the filter processing. Herein, % means reminder calculation, and ÷ means division where a reminder is rounded down.

On the other hand, FIG. 6A, FIG. 6B, FIG. 6C, and FIG. 6D illustrate a multiplier allocation method with respect to the tap data of the filter tap in a case where the filter coefficients have the symmetry. In this case, the number of tap data (M) of the filter tap is 16, and the number of multipliers (N) is 25 which is higher than M. For this reason, when the tap data is associated with the multiplier (8-bit coefficient) on a one-to-one basis, seven multipliers are excessive.

Figure 6A:
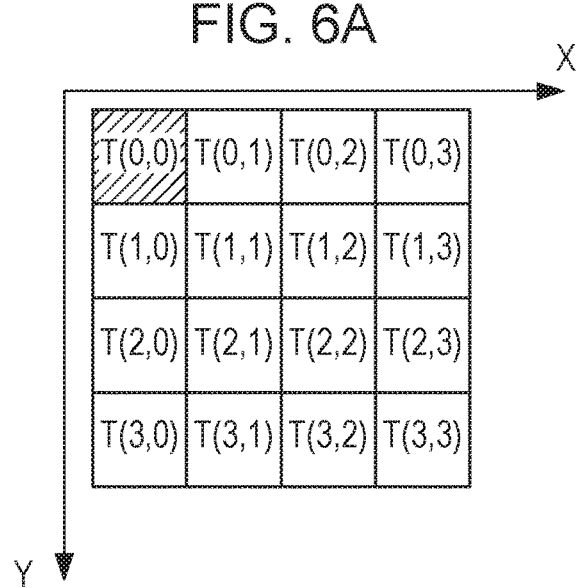
FIG. 6A, FIG. 6B, FIG. 6C, and FIG. 6D are illustrative diagrams for describing the allocation of the filter coefficients according to the first exemplary embodiment.
Figure 6B:
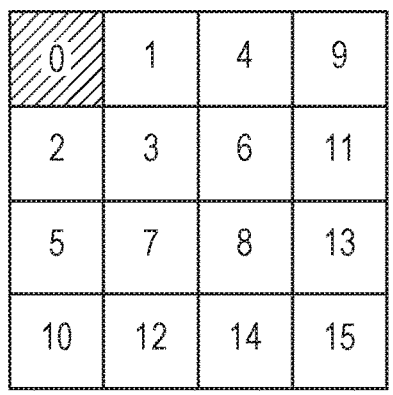

In view of the above, according to the present exemplary embodiment, first, the filter operation unit 12 allocates each multiplier to 16 pieces of the tap data for the first round (associated on a one-to-one basis) as illustrated in FIG. 6A and FIG. 6B. That is, 8-bit coefficients C(0) to C(15) are associated with the respective taps. Then, the filter operation unit 12 performs a partial product-sum operation with respect to the multipliers and the tap data which are associated with each other.

Figure 6C:
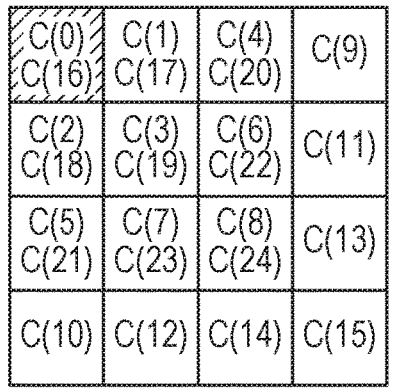
Figure 6D:
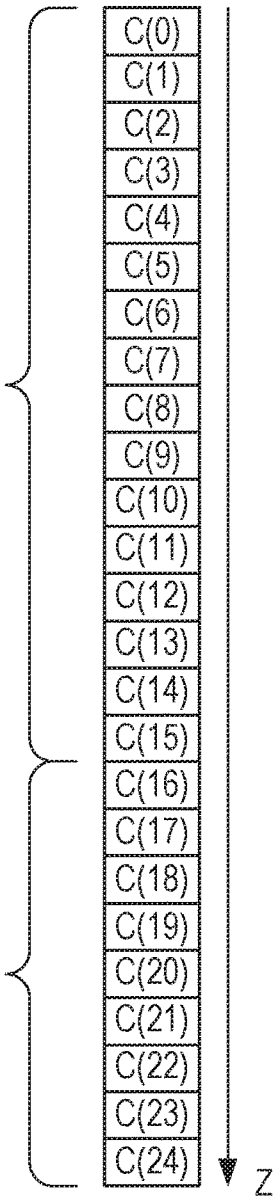

Furthermore, the filter operation unit 12 allocates the remaining nine multipliers to the tap data of the filter tap for the second round as illustrated in FIG. 6D. Therefore, coefficients C(16) to C(24) corresponding to the remaining multipliers are associated with the respective taps as illustrated in FIG. 6C. The tap data to which the two multipliers are allocated means association with a 16-bit filter coefficient. Herein, according to the present exemplary embodiment, the filter operation unit 12 allocates the multiplier to the tap data of the filter tap in accordance with a distance from the pixel data 38 at the filter center (pixel data of interest) to the neighborhood pixel data. The pixel data 38 at the filter center (pixel data of interest) passes through the symmetric axis, and one obtained by being folded with respect to this symmetric axis becomes the filter tap. For this reason, the distances to the respective pieces of pixel data which form the respective filter taps from the pixel data 38 at the filter center are the same. Therefore, the multipliers may be allocated in accordance with the distance on the filter tap in this case.

When the order is determined in according with the distance from the tap data at T(0, 0) corresponding to the image data 38 at the filter center, the result is obtained as illustrated in FIG. 6B. It should be noted however that the tap data located in the upper right is prioritized with regard to the tap data located at the same distance from the filter center in FIG. 6B.

The filter operation unit 12 allocates the remaining nine multipliers to the tap data in accordance with the order of distances from the filter center. As a result of the above-described allocation, two multipliers corresponding to the 8-bit coefficient are allocated to the tap data close to the center of the filter, and one multiplier corresponding to the 8-bit coefficient is allocated to the tap data in the surrounding part of the filter as illustrated in FIG. 6C. That is, the filter operation unit 12 associates the bit count of the filter coefficient with the data group (tap data) at a short distance from the data of interest by priority. As a result, the filter coefficient having a still higher bit count is associated with the data group (tap data) at a short distance from the data of interest.

The filter operation unit 12 executes the partial product-sum operation S(1)=Σ(T(z % 4, z÷4)*C(z)) (z: 0 to 15) by using the coefficients allocated in the first round as described above in the filter operation in a case where the filter coefficients have the symmetry. It should be noted however that, with regard to the coefficients z=0 to 8, the sign bit that affects enlargement of a dynamic range of the filter coefficients using the two coefficients allocated to the corresponding tap data is ignored or set as 0 which indicates the absence of the sign. Furthermore, the filter operation unit 12 executes the partial product-sum operation S(2)=Σ(T(D(z))*C(z)) (z: 16 to 24) by using the coefficients allocated in the second round. Herein, D(z) indicates a distance order of the filter tap to which the coefficient C(z) is allocated from the filter center, and T(D(z)) indicates tap data corresponding to the distance order D(z).

Next, the filter operation unit 12 combines the thus calculated partial product-sum operation results with one another and executes the product-sum operation S=S(2)*128+S(1). Herein, 128 by which the result of the product-sum operation S(2) is multiplied is a value representing a high-order digit of the coefficient range (0 to 127) for the first round and corresponds to a power of 2 based on a value obtained by subtracting the sign bit from the bit width of the coefficient. As a result, a coefficient of a 7-bit range is represented by the partial product-sum operation S(1), and its high-order signed 8-bit coefficient is represented by the partial product-sum operation S(2). With regard to the thus calculated result of the product-sum operation S, the dynamic range of the filter coefficients becomes a filter result equivalent to signed 15 bits in the central part of the filter. Therefore, it is possible to enlarge the bit width of the filter coefficients in the filter center without increasing the circuit scale. It should be noted that the processing for changing the allocation of the multipliers (holding the coefficients having the predetermined bit width) with respect to the tap data has been described above as an example, but processing for changing the association of the bit count of the coefficients with respect to the tap data may be performed instead of this processing.

The above-described filter processing is executed across the entire range of the image data while the pixel of the image data supplied to the filter operation unit 12 by the filter tap supply unit 11 is sequentially moved. As a result, the filter processing with respect to the entirety of the image data is executed.

After the above-described filter processing is executed, the normalization unit 13 normalizes the result of the product-sum operation S calculated by the filter operation unit 12 in accordance with the range (bit width) of the output image data.

The image data output unit 14 outputs the output data normalized by the normalization unit 13 to the external apparatus. A display apparatus such as a display or a storage device such as a main storage unit that temporarily holds the image data may be used as the external apparatus.

As described above, according to the present exemplary embodiment, when the plurality of filter circuits with respect to the image data are set in accordance with the symmetry of the filter coefficients, the plurality of filter processings can be appropriately implemented while the increase in the circuit scale is suppressed.

An absolute value of the filter coefficient in a part close to the center of the filter (central part) may be higher than that in a surrounding part of the filter in the filter processing in some cases, and this tendency is further intensified as the number of taps is increased. According to the present exemplary embodiment, in a case where the symmetry of the filter coefficients exists, the filter tap supply unit 11 performs the folding and adding operation on the image data and practically increases the number of the tap data of the filter tap to generate the filter taps.

In addition, since the number of the tap data of the filter tap is practically increased, it is demanded that the dynamic range of the filter coefficients obtained in the central part of the filter is also expanded. Herein, according to the present exemplary embodiment, the filter operation unit 12 allocates the multipliers to the tap data in accordance with the distance from the pixel data of interest at the filter center to the neighborhood pixel data. As a result, it is possible to expand the dynamic range by expanding the bit width at the filter center.

In this manner, according to the present exemplary embodiment, it is possible to realize the filter circuit that can switch the plurality of filters while the number of the tap data of the filter tap is increased and also the dynamic range of the filter coefficients is expanded. Furthermore, when the above-described filter circuit is realized, the operation amount and operational resources such as coefficient registers in the filter operation are not increased along with the realization, and it is possible to suppress the increase in the circuit scale.

In addition, according to the present exemplary embodiment, in a case where the number of multipliers is higher than the number of filter taps, it is possible to allocate the multipliers in accordance with the distance from the filter center, and efficient use of the operational resources can be realized.

According to the first exemplary embodiment, the filter processings with respect to the image data are switched in accordance with the symmetry of the filter coefficients. Hereinafter, the filter circuit according to a second exemplary embodiment will be described as an example in a case where the processing is performed while various filter processings with respect to the signal data are switched. It should be noted that the allocation of the multiplier to the tap of the filter used for the filter processing has been described according to the first exemplary embodiment. According to the present exemplary embodiment, descriptions will be given while the coefficient corresponding to the multiplier is set as a target of the allocation, but it practically means the same as above since the multiplier corresponds to the coefficient.

Figure 7:
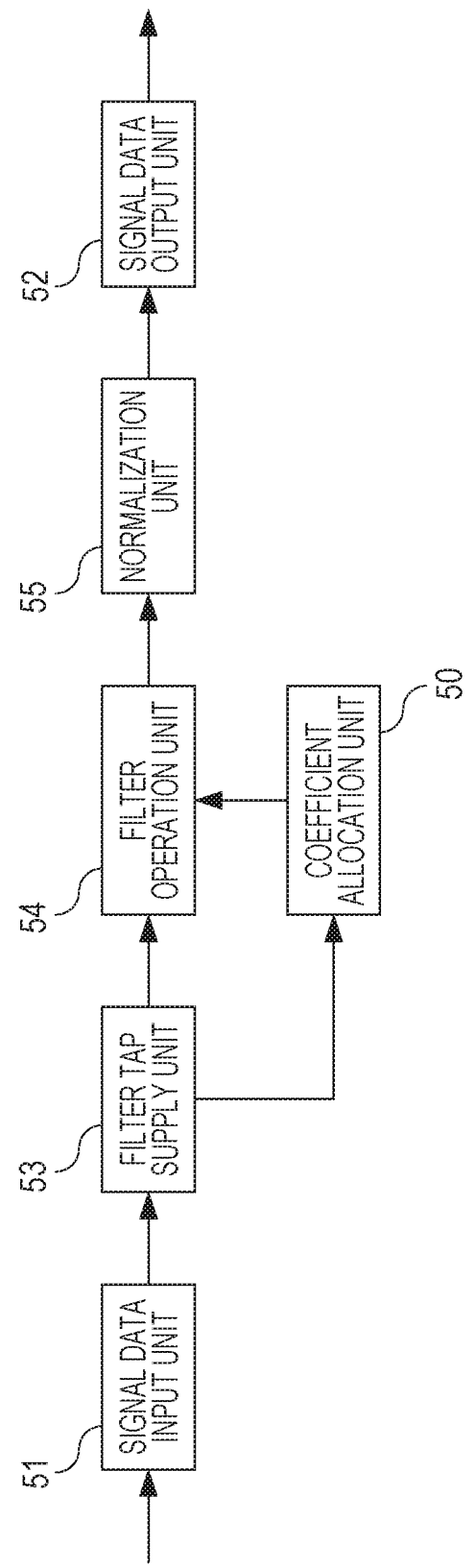
FIG. 7 is a block diagram illustrating a configuration example of the filter circuit according to a second exemplary embodiment.

FIG. 7 is a block diagram of the filter circuit according to the present exemplary embodiment. The filter circuit according to the present exemplary embodiment includes a signal data input unit 51, a filter tap supply unit 53, a coefficient allocation unit 50, a filter operation unit 54, a normalization unit 55, and a signal data output unit 52. Descriptions of respective components corresponding to the components described according to the first exemplary embodiment will be omitted.

The signal data input unit 51 inputs signal data corresponding to a target of the filter processing from the external apparatus.

The signal data output unit 52 outputs the signal data on which the filter processing has been performed to the external apparatus.

The coefficient allocation unit 50 performs the allocation of the coefficient having the predetermined bit width to the tap data in accordance with the distance from the pixel data of interest from the positional relationship between the positional information of the pixel data of interest and the positional information of the tap data obtained from the filter tap supply unit 53. The filter operation unit 54 executes the product-sum operation of the tap data and the respective coefficients on the basis of the information of the coefficient allocation. The coefficient allocation unit 50 described according to the present exemplary embodiment corresponds to part of the functions cut out from the filter operation unit 12 described according to the first exemplary embodiment.

Hereinafter, descriptions will be given of an example in which two-dimensional finite impulse response (FIR) filter processing having the coefficient symmetry and one-dimensional infinite impulse response (IIR) filter processing are switched as the filter processing realized according to the second exemplary embodiment. Hereinafter, a case will be described as an example where the signal data targeted by the two-dimensional FIR filter processing is two-dimensional data such as image data, and the signal data targeted by the one-dimensional IIR filter processing is one-dimensional data such as data for one line of the image data or audio data.

Figure 8A:
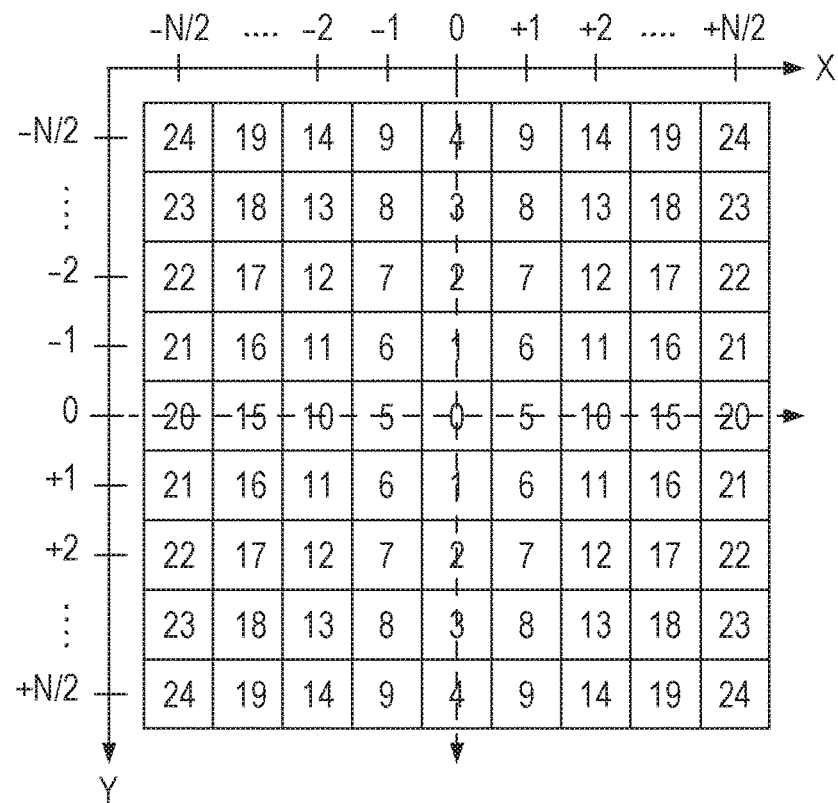
FIG. 8A and FIG. 8B are illustrative diagrams for describing tap data in a case where coefficient symmetry exists according to the second exemplary embodiment.
Figure 8B:
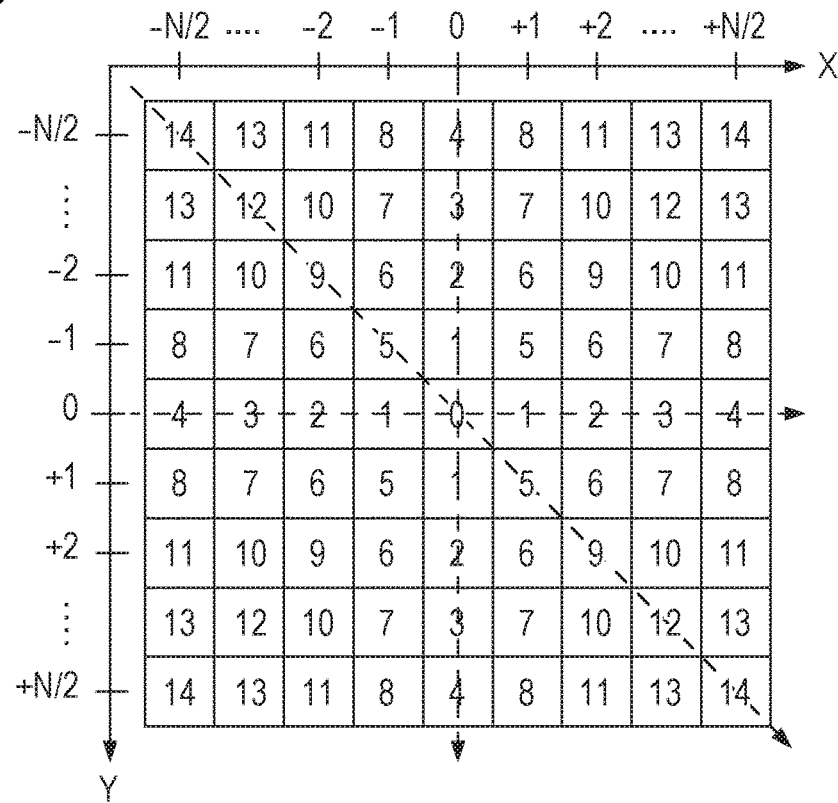
Figure 9:
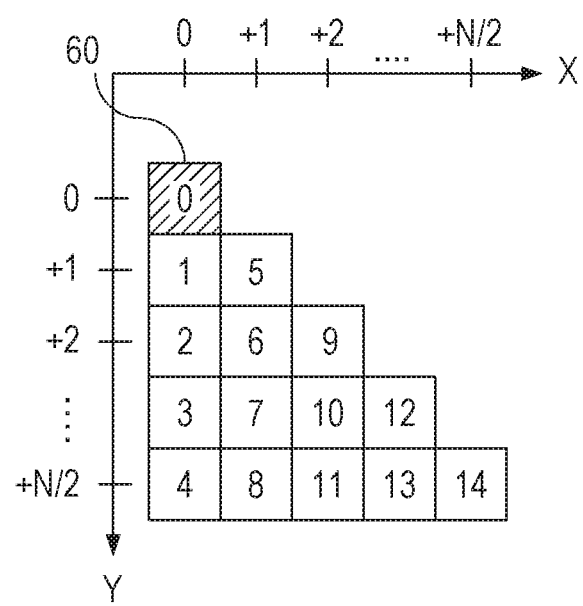
FIG. 9 illustrates a positional relationship between the filter tap and the tap data.

Descriptions will be given of an example in which symmetry is realized with respect to another axis with regard to the coefficient symmetry of the two-dimensional FIR filter processing in addition to the two axes of the X axis and the Y axis described according to the first exemplary embodiment. That is, filter coefficients (numbers in FIG. 8A and FIG. 8B indicate the same filter coefficients) symmetric with respect to the X axis and the Y axis as illustrated in FIG. 8A turn to filter coefficients as illustrated in FIG. 8B when the symmetry with respect to the diagonal axis is further realized. The filter coefficients as illustrated in FIG. 8B are isotropic filter coefficients having no differences with respect to the X axis and the Y axis. When the folding and adding operation is performed on the above-described filter coefficients with respect to the respective symmetric axes that pass through the pixel data of interest at the filter center, it is possible to obtain a positional relationship between filter taps illustrated in FIG. 9 and the tap data. It should be noted that the tap data 60 is the image data at the filter center itself (pixel data of interest).

Figure 10:
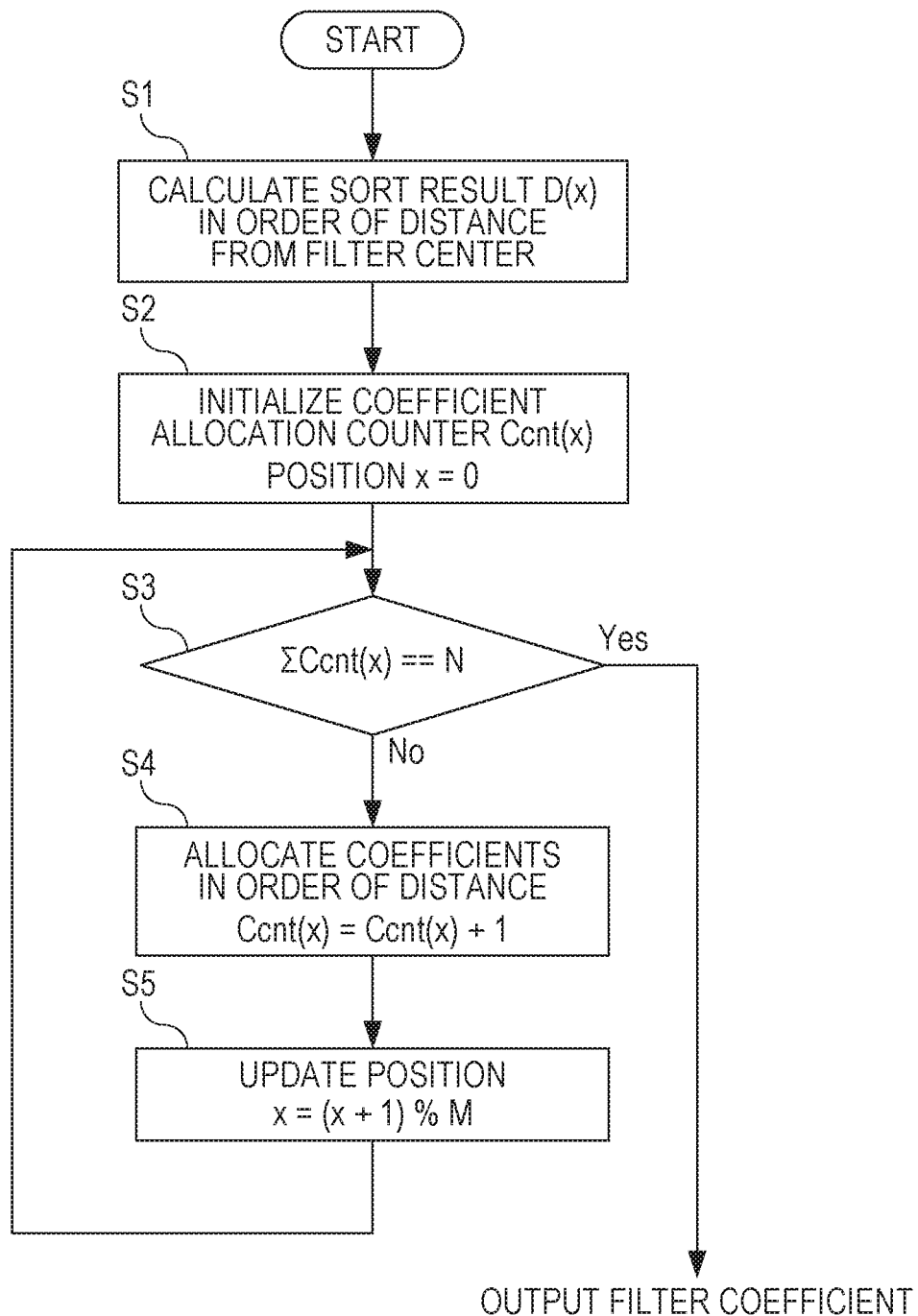
FIG. 10 is a flow chart of allocation processing for the filter coefficients according to the second exemplary embodiment.

According to the present exemplary embodiment, the coefficient allocation unit 50 obtains a value of a coefficient allocation counter Ccnt(x) counting the number of coefficient allocations to the respective pieces of tap data by processing illustrated in a flow chart of FIG. 10. It should be noted that, according to the present exemplary embodiment, the number of tap data of the filter taps is set as M, and the number of coefficients is set as N.

Figure 11:
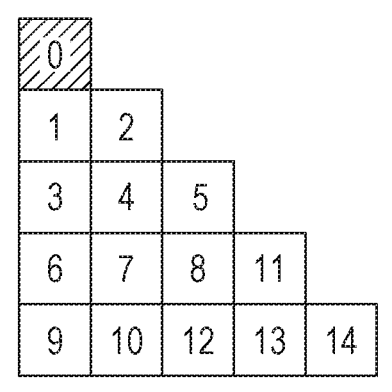

In step S1, the coefficient allocation unit 50 calculates sort results D(x) in the order of distance from the center of the filter. When sorting in the order of distance is performed on the basis of the information of the positional relationship between the position of the center of the filter and the tap data which is output from the filter tap supply unit 53 illustrated in FIG. 9, the sort result D(x) as illustrated in FIG. 11 is obtained.

In step S2, the coefficient allocation unit 50 initializes the coefficient allocation counter Ccnt(x) and sets the count value with respect to all the tap data as 0. The coefficient allocation unit 50 also initializes a tap position x to 0.

In step S3, the coefficient allocation unit 50 determines whether or not a total value of all the coefficient allocation counters Ccnt(x) becomes the number N of coefficients. In a case where the total value of all the coefficient allocation counters Ccnt(x) becomes the number N of coefficients, the allocation of all of the coefficients is completed. The coefficient allocation unit 50 ends the processing of the flow chart and outputs the coefficients to the filter operation unit 54. In a case where the total value of all the coefficient allocation counters Ccnt(x) does not reach N, the flow proceeds to step S4.

In step S4, the coefficient allocation unit 50 executes the coefficient allocation in the order of distance and increments (increases) the coefficient allocation counter Ccnt(x) of the current tap position x. It should be noted that the count value of the coefficient allocation counter Ccnt(x) is equivalent to the number of coefficients allocated to the respective taps.

In step S5, the coefficient allocation unit 50 updates the tap position x. The tap position x is increased by 1, and in a case where the value is higher than or equal to the number M of tap data of the filter taps, the coefficient allocation unit 50 divides the tap position x by M and sets the reminder as the tap position x. After the update of the tap position is performed in step S5, the coefficient allocation unit 50 returns to step S3 and executes processing end determination.

As a result of the above-described processing, the coefficient allocation counter value for each the tap data, that is, the number of allocated coefficients is calculated irrespective of the number M of tap data of the filter taps and the number N of coefficients.

The coefficient allocation unit 50 sequentially performs the allocation of coefficients to the tap data of the filter taps in the ascending order of distance from the center of the filter in accordance with the number of obtained coefficients. Furthermore, after the coefficient allocation unit 50 allocates the coefficients to the tap data of all of the filter taps, the coefficient allocation unit 50 sequentially performs the allocation of coefficients from the filter center again. Therefore, the coefficients are uniformly allocated to the whole area of the filter taps, and also, since the remaining coefficients are allocated to the center of the filter, it is possible to cope with the filter processing for a large number of taps.

The filter operation unit 54 performs the product-sum operation with the tap data in accordance with the thus obtained number of coefficient associations for each tap data (number of allocations) and executes the filter operation. For example, the filter operation unit 54 calculates a partial product $P=T(x, y)*C(z)$ in the tap data to which only one signed v-bit coefficient is allocated. The filter operation unit 54 calculates the partial product $P=T(x, y)*C(z)+T(x, y)*C(z+1)*(2^{\wedge}(v-1))+ \ldots +T(x, y)*C(z+w)*(2^{\wedge}((v-1)*w))$ in the tap data to which w coefficients are allocated. It should be noted however that coefficients other than the coefficient C(z) having the predetermined bit width is to be a positive number or a (v−1)-bit coefficient where the sign bit is removed. When an operation of multiplying the partial product of the above-described tap data to which the plurality of coefficients are allocated by a power of 2 is considered as an equivalent bit shift operation, the number of coefficient allocations and the number of times to perform the multiplication in the filter operation are matched with each other. Therefore, the processing may be performed in accordance with the flow chart illustrated in FIG. 10 also in a case where the association of the multipliers corresponding to the coefficients is considered. It should be noted that the filter operation unit 54 obtains the total sum of the partial products for each tap data as the filter operation result.

Next, descriptions will be given of an example of the one-dimensional IIR filter.

Figure 12:
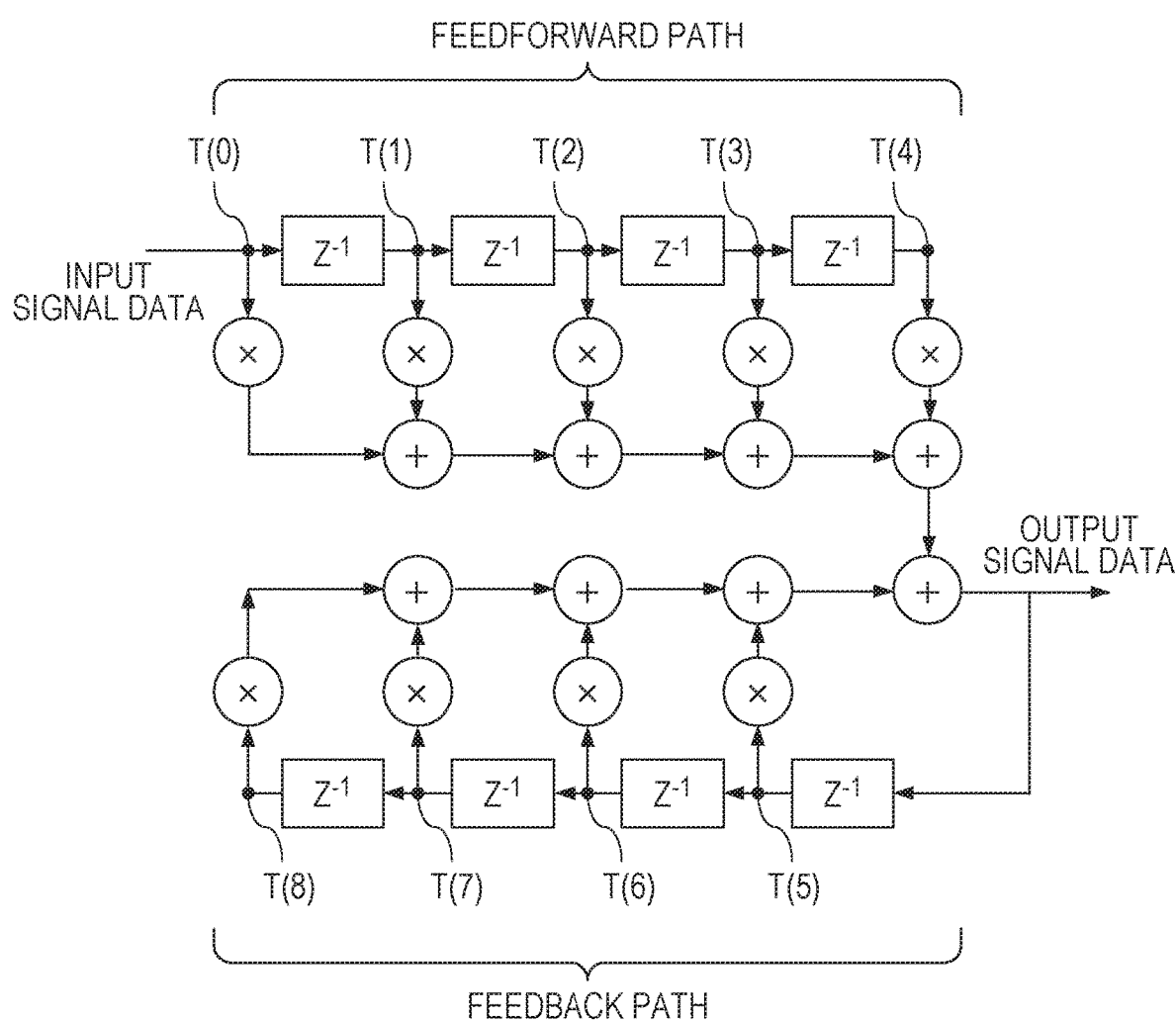
FIG. 12 illustrates an example of infinite impulse response (IIR) filter processing according to the second exemplary embodiment.

FIG. 12 illustrates a typical processing example of the IIR filter. A path in an upper part of FIG. 12 corresponds to a feedforward path equivalent to the FIR filter, and a path in a lower part corresponds to a feedback path in which a corrected value is calculated on the basis of a filter result. In FIG. 12, the tap data in the feedforward path is set as the data of interest T(0), and pieces of the tap data delayed in the time axis direction are set as T(1), T(2), T(3), and T(4). Pieces of the tap data in the feedback path are constituted by T(5), T(6), T(7), and T(8) obtained by delaying the output result by one by one. The filter operation unit 54 obtains the filter processing result by multiplying these pieces of tap data by predetermined coefficients.

In general, the IIR filter can realize the equivalent filter performance by using fewer taps than the taps used by the FIR filter. On the other hand, the IIR filter has such disadvantages that coefficient sensitivity is high and output stability is not satisfactory. For this reason, the IIR filter is to use a considerable bit width of the filter coefficients, and the used bit width varies depending on its use.

Figure 13:
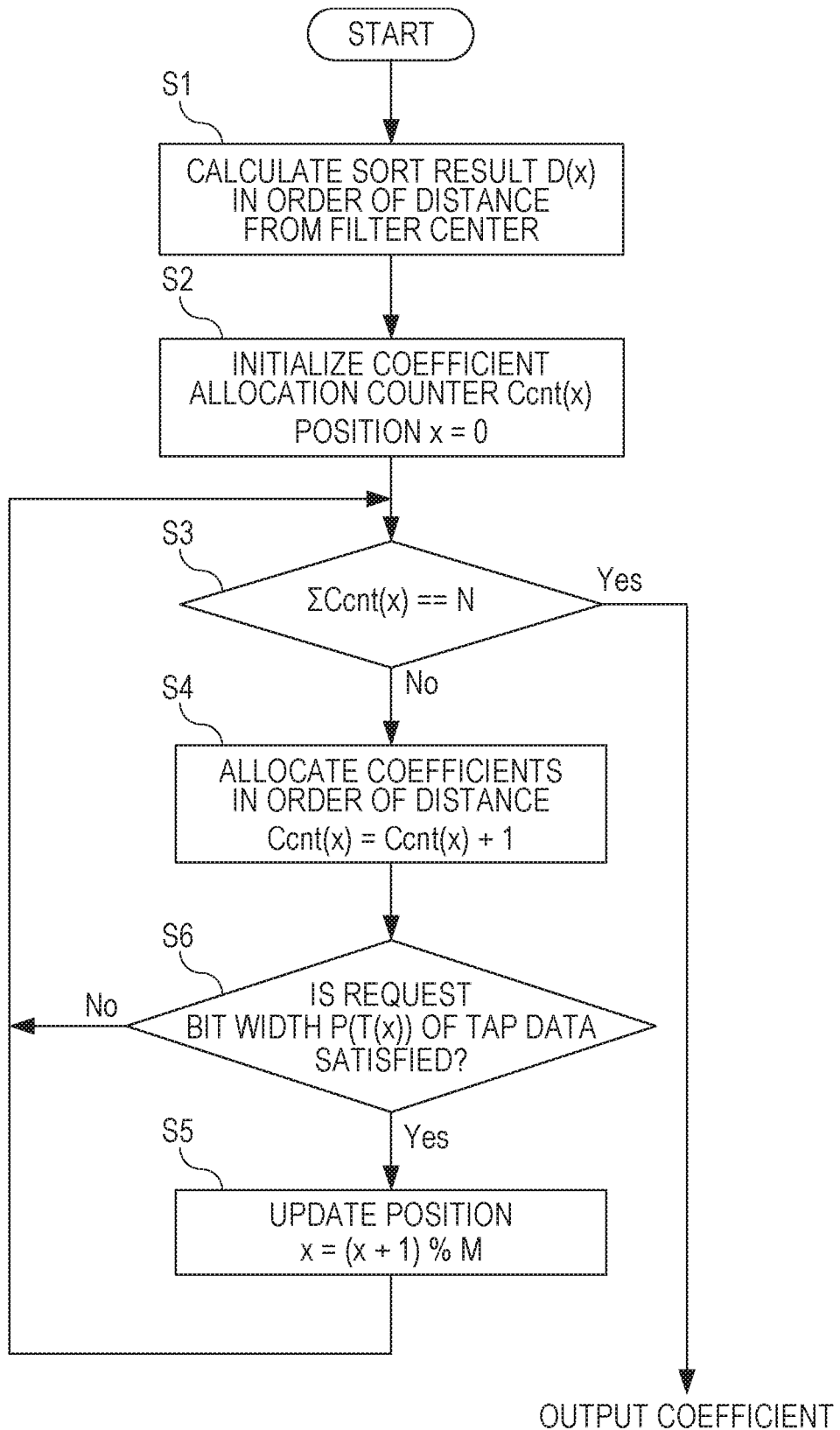
FIG. 13 is a flow chart of the allocation processing for the filter coefficients according to the second exemplary embodiment.

According to the present exemplary embodiment, the used bit width for each tap data is set as P(T(x)). The allocation of coefficients with respect to the respective pieces of tap data will be described by using a flow chart illustrated in FIG. 13.

In step S1, the coefficient allocation unit 50 calculates the sort results D(x) in the order of distance from the center of the filter. In the case of the IIR filter processing according to the present exemplary embodiment, a distance between the tap data corresponding to the pixel data of interest and the other data group corresponds to a temporal distance. FIG. 14A illustrates time axes arranged on a straight line when the pixel data of interest and data of the data group is input or output. When these are arranged in the order of time distance, the order illustrated in FIG. 14B is obtained. It should be noted however that the tap data of the feedback path is prioritized among the tap data of the feedforward path and the tap data of the feedback path having the same time distance. This is because the feedback path particularly has the higher coefficient sensitivity, and the number of eventually allocated coefficients is increased in the case of the IIR filter.

Descriptions on step S2 to step S5 are as described above and omitted here.

In step S6, the coefficient allocation unit 50 determines whether or not a request bit width P(T(x)) of the tap data T(x) of the tap position x is satisfied. When the bit width of the coefficient to be allocated is set as w, the bit width of the coefficient to be allocated is 0 in a case where Ccnt(x) is 0, and the bit width of the coefficient be allocated is (Ccnt(x)−1)*(w−1)+w in other cases. The coefficient allocation unit 50 determines whether or not this bit width is higher than or equal to the request bit width P(T(x)) and proceeds to step S3 in a case where the bit width does not exceed the request bit width P(T(x)). In a case where the bit width exceeds the request bit width P(T(x)), the coefficient allocation unit 50 proceeds to step S5 and completes the allocation of coefficients to the tap data T(x).

The coefficient allocation unit 50 performs the allocation of coefficients so as to satisfy the request bit width P(T(x)) of the tap data T(x) arranged in the order of distance in the above-described processing. In a case where the bit width and the number of the coefficients are not enough to satisfy the request bit width P(T(x)) of all of the tap data T(x), the coefficient allocation unit 50 does not allocate the coefficient to the tap data far from the data of interest. The above-described allocation of coefficients is preferably performed since the IIR filter can realize the equivalent filter performance by using fewer filter taps than the filter taps of the FIR filter, and the coefficient sensitivity is high to satisfy the request bit width of the tap data.

The filter operation unit 54 performs the product-sum operation with the tap data in accordance with thus obtained filter coefficient for each tap data and executes the filter operation.

As described above, according to the present exemplary embodiment, the filter processing is performed by allocating N coefficients to various filter processings in which the number of filter taps is M. The various filter processings can be realized while the previously prepared coefficients are utilized as much as possible in any of the filter processings.

As a result, according to the present exemplary embodiment, it is possible to appropriately implement the plurality of filter processings while the increase in the circuit scale is suppressed. It should be noted that the coefficients used according to the present exemplary embodiment do not correspond to the tap data on a one-to-one basis and are treated as multiplier factors set in the multiplication resources in the filter processings. Therefore, the coefficients according to the present exemplary embodiment may be paraphrased as the multiplication resources.

The filter circuit according to a third exemplary embodiment can switch the inter-frame and intra-frame filter processings with respect to video image data.

FIG. 15 is a block diagram of the filter circuit according to the present exemplary embodiment. The filter circuit according to the present exemplary embodiment includes a video image data input unit 70, a tap data compression unit 71, a tap data storage unit 72, a filter tap supply unit 74, a filter operation unit 75, a coefficient allocation unit 76, a normalization unit 77, and a video image data output unit 73. Descriptions on the respective components corresponding to the components described according to the first exemplary embodiment and the second exemplary embodiment will be omitted here.

The video image data input unit 70 inputs the video image data corresponding to the processing target from the external apparatus. The video image data is sequentially input for each image data in the frame.

The video image data output unit 73 outputs the video image data on which the filter processing has been already performed to the external apparatus.

The tap data compression unit 71 compresses the tap data in a frame corresponding to a filter processing target and outputs the compressed tap data to the filter tap supply unit 74 or the tap data storage unit 72.

Figure 16A:
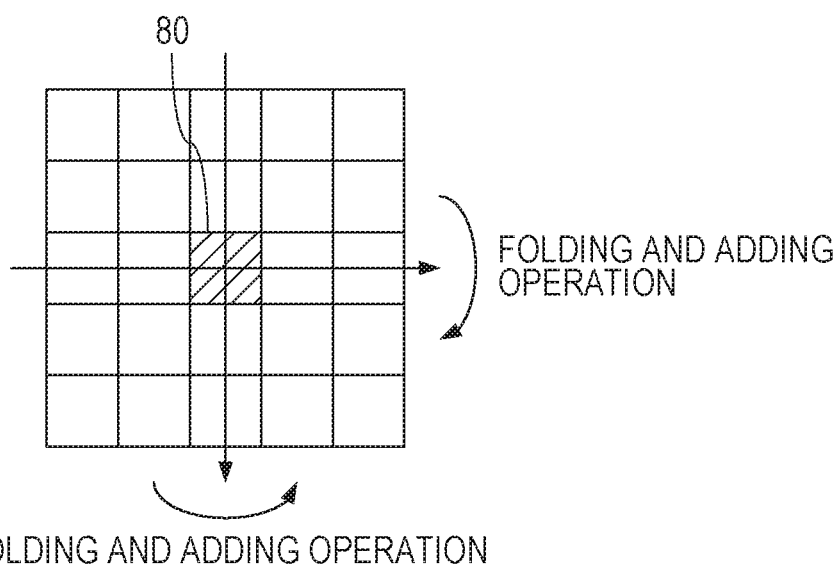
FIG. 16A and FIG. 16B are illustrative diagrams for describing tap data compression according to the third exemplary embodiment.
Figure 16B:
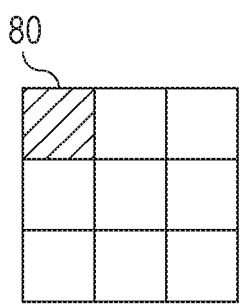

Here, a compression method for the tap data will be described with reference to FIG. 16A and FIG. 16B. FIG. 16A illustrates a filter tap in a case where the filter processing is performed only within the frame. The tap data compression unit 71 sets the center of this filter as the pixel data of interest and performs the folding and adding operation with respect to the X axis and the Y axis to calculate the tap data of FIG. 16B. The tap data compression unit 71 outputs this tap data to the tap data storage unit 72 as the tap data group corresponding to the pixel data of interest 80. Since a large number of pieces of the tap data are stored with respect to the single pixel data of interest, which becomes a data capacity for a plurality of frames, the tap data is preferably set to be a small capacity as much as possible. For example, at the time of the generation of the tap data, the folding and adding operation with respect to another symmetric axis may be executed to reduce the number of pieces of the tap data or reduce the data capacity by using a related-art data compression technology with respect to the tap data group.

The tap data storage unit 72 temporarily holds the tap data generated by the tap data compression unit 71 with respect to the data of interest and supplies the tap data with respect to the data of interest in accordance with the request of the filter tap supply unit 74.

The filter tap supply unit 74 supplies the tap data to the filter operation unit 75 in accordance with the switching of the filter processing. In a case where the filter processing is the intra-frame filter processing, the filter tap supply unit 74 bypasses and supplies the tap data compressed by the tap data compression unit 71 to the filter operation unit 75. Alternatively, the filter tap supply unit 74 generates data of the filter tap within the frame on the basis of the input video image data. In the case of the inter-frame filter processing, the filter tap supply unit 74 supplies the tap data used for the filter processing by using the tap data generated by the tap data compression unit 71 as illustrated in FIG. 16B and the tap data read out from the tap data storage unit 72.

Figure 17:
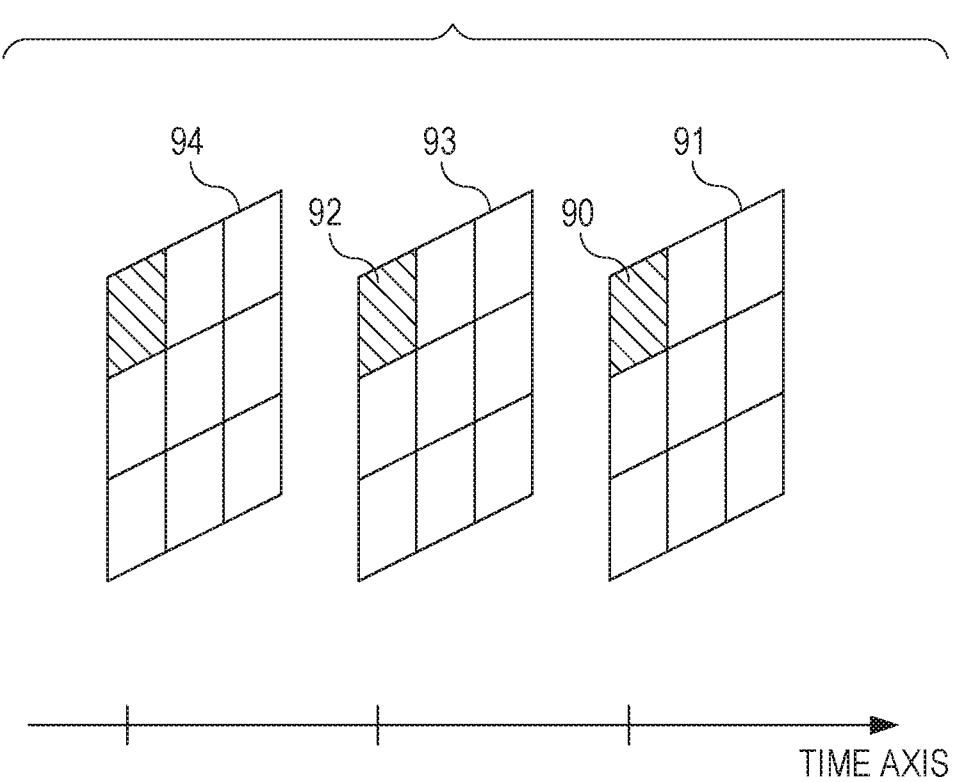
FIG. 17 is an illustrative diagram for describing the tap data at the time of inter-frame filter processing according to the third exemplary embodiment.

As illustrated in FIG. 17, pixel data of interest 90 and tap data 91 in a certain frame are generated by the tap data compression unit 71. Tap data 93 and 94 located at the same position as the pixel data of interest 90 with respect to the image data having different frames are read out from the tap data storage unit 72. The filter tap supply unit 74 sets image data 92 corresponding to the center of the frame on the time axis among plural pieces of pixel data of interest as the pixel data of interest and outputs the image data 92 to the filter operation unit 75 and the coefficient allocation unit 76.

The coefficient allocation unit 76 performs the allocation of coefficients in accordance with the distance from the data of interest to the respective pieces of tap data on the basis of positional information of the data of interest and a positional relationship with the tap data obtained from the filter tap supply unit 74.

Hereinafter, a detail of the filter processing according to the present exemplary embodiment will be described. While the case of the intra-frame filter processing has been described according to the other exemplary embodiments, the inter-frame filter processing will be described with reference to FIG. 17.

The coefficient allocation unit 76 sorts the tap data between the frames in the order of distance from the data of interest 92 to the tap data in the respective frames and sets the coefficients. The distance between the data of interest and the tap data is separated into a spatial distance $Ds(x)$ with respect to the tap data within the same frame and a temporal distance $Dt(x)$ with respect to the tap data between the frames. The coefficient allocation unit 76 calculates a distance $D(x)=a*Ds(x)+b*Dt(x)$ (a and b: weighting coefficients) by way of a combination of the respective distances and performs sort processing in the order of distance from the data of interest on the basis of the distance $D(x)$. It should be noted that a and b corresponding to the weighting coefficients change depending on a relative relationship between a resolution of the video image data and a frame rate. A method of allocating the coefficients after the order of distance is determined may be performed in accordance with the flow chart illustrated in FIG. 10 or FIG. 13.

As described above, according to the present exemplary embodiment, the example has been described in which the intra-frame filter processing and the inter-frame filter processing are switched with respect to the video image data. Even in a case where any one of the filter processings is selected, it is possible to efficiently use the previously prepared multiplication resources, and the filter performance can be enhanced to a maximum extent.

As a result, according to the present exemplary embodiment, it is possible to appropriately implement the plurality of filter processings while the increase in the circuit scale is suppressed. It should be noted that the still more significant sensitivity of the tap data can be increased by changing a ratio of the spatial distance and the temporal distance between the tap data in accordance with the resolution and the frame rate of the video image data.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-224915, filed Nov. 18, 2016, and Japanese Patent Application No. 2017-161038, filed Aug. 24, 2017, which are hereby incorporated by reference herein in their entirety.

What is claimed is:

1. An image processing circuit that executes filter processing using a filter with respect to image data, the image processing circuit comprising:
   a supply unit configured to supply M, where M is a natural number, pieces of data of filter taps from data of interest in the image data and a data group in a vicinity of the data of interest; and
   a plurality of multipliers each configured to hold a coefficient having a predetermined bit count and multiply one of the M tap data with the corresponding coefficient according filter coefficients constituting the filter,
   wherein each of the plurality of multipliers is allocated to the one of the M tap data based on an allocation rule related to the plurality of pre-determined bit counts and the filter coefficients constituting the filter,
   wherein the predetermined bit count held by the multiplier is a bit count of a bit width which is lower than a bit count of the filter coefficient, and
   wherein the vicinity is defined as a window having a size based on M.

2. The image processing circuit according to claim 1, further comprising an operation unit configured to execute a product-sum operation while the M pieces of the data of the filter taps supplied by the supply unit are associated with the filter coefficients.

3. The image processing circuit according to claim 2, wherein the setting unit allocates the coefficients to exceed bit widths of the respective filters on which the product-sum operation is performed by the operation unit.

4. The image processing circuit according to claim 1, wherein each of the plurality of multipliers can perform multiplication of a common divisor of bit widths of the filter coefficients.

5. The image processing circuit according to claim 2,
   wherein the operation unit executes the product-sum operation by using a plurality of mutually different filters, and
   wherein the image processing circuit includes a number of multipliers corresponding to a highest total number of multiplications for each of the plurality of filters and a throughput as the plurality of multipliers.

6. The image processing circuit according to claim 1,
   wherein the supply unit
   supplies the data of interest in the image data and data in the vicinity of the data of interest to the operation unit without changes as the M pieces of the data of the filter taps in a case where the filter does not have symmetry of the filter coefficients, and
   performs a folding and adding operation on the data of interest and the data in the vicinity of the data of interest to generate the M pieces of the data of the filter taps to be supplied to the operation unit in a case where the filter has the symmetry of the filter coefficients.

7. The image processing circuit according to claim 1, wherein the setting unit associates the coefficients to the data group at a distance in the vicinity of the data of interest by priority.

8. The image processing circuit according to claim 1, wherein the setting unit associates more of the coefficients to the data group at a distance in the vicinity of the data of interest.

9. The image processing circuit according to claim 1, wherein the operation unit associates the coefficient with the filter tap on a basis of any one of a spatial distance weighted by at least a resolution of the image data and a temporal distance weighted by a frame rate of the image data.

10. The image processing circuit according to claim 9, wherein the setting unit associates the coefficient with the filter tap on a basis of a distance obtained by combining the spatial distance with the temporal distance.

* * * * *